(12) United States Patent
Akiyama et al.

(10) Patent No.: US 7,933,519 B2
(45) Date of Patent: Apr. 26, 2011

(54) OPTICAL CROSS-CONNECT USING WAVELENGTH SELECTIVE SWITCHES

(75) Inventors: Yuichi Akiyama, Kawasaki (JP);
Takafumi Terahara, Kawasaki (JP);
Hiroki Ooi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 720 days.

(21) Appl. No.: 11/984,534

(22) Filed: Nov. 19, 2007

(65) Prior Publication Data
US 2008/0138068 A1    Jun. 12, 2008

(30) Foreign Application Priority Data
Dec. 7, 2006    (JP) .................................. 2006-330120

(51) Int. Cl.
*H04J 14/00* (2006.01)
(52) U.S. Cl. ................. 398/50; 398/48; 398/49
(58) Field of Classification Search ............ 398/45, 398/46, 48–50, 55–57, 83
See application file for complete search history.

(56) References Cited

U.S. PATENT DOCUMENTS
2002/0186434 A1* 12/2002 Roorda et al. ............... 359/128
2005/0226551 A1* 10/2005 Pichler et al. ................. 385/17

OTHER PUBLICATIONS
Patent Abstracts of Japan, Publication No. 2004-343231, published Dec. 2, 2004 (1 page).

\* cited by examiner

*Primary Examiner* — Dalzid Singh
(74) *Attorney, Agent, or Firm* — Fujitsu Patent Center

(57) ABSTRACT

An optimally-sized optical cross-connect that switches optical signal paths with a minimum number of wavelength selective switches and their interconnections. To switch optical signals of N routes (N=1, 2, . . . ), an optical cross-connect includes a 2×N (2-input, N-output) wavelength selective switch for each of N input routes and a N×2 (N-input, 2-output) wavelength selective switch for each of N output routes. One input port of each 2×N wavelength selective switch receives an optical signal from a corresponding input route, while the other input port of the same receives an optical add signal from a corresponding add route. One output port of each N×2 wavelength selective switch outputs an optical signal to a corresponding output route, while the other output port outputs an optical drop signal to a corresponding drop route.

4 Claims, 39 Drawing Sheets

Infeasible Switching (1): Outputs not adjacent

**Infeasible Switching (2):
Optical paths collide at an output port**

Infeasible Switching (3): Optical paths twisted

Infeasible Switching (4):
No output port at symmetric position to input port

**Infeasible Switching (5):
Single input to multiple outputs**

| Add / Through | A#1→Rout#1 | A#1→Rout#2 | A#1→Rout#3 | A#1→Rout#4 |
|---|---|---|---|---|
| Rin#1→Rout#2 | YES | NO (a) | YES | NO (c) |
| Rin#1→Rout#3 | YES | NO (b) | NO (a) | YES |
| Rin#1→Rout#4 | YES | NO (b) | NO (b) | NO (a) |

NO (a): Colliding optical paths
NO (b): Twisted optical paths
NO (c): Non-adjacent output ports YES: Can work simultaneously
NO: Cannot work simultaneously (need to choose)

FIG. 30

| Through \ Add | A#1→Rout#1 | A#1→Rout#2 | A#1→Rout#3 | A#1→Rout#4 |
|---|---|---|---|---|
| Rin#1→Rout#2 | NO (b) | NO (a) | YES | NO (c) |
| Rin#1→Rout#3 | NO (b) | NO (b) | NO (a) | YES |
| Rin#1→Rout#4 | NO (b) | NO (b) | NO (b) | NO (a) |

T21

NO (a): Colliding optical paths
NO (b): Twisted optical paths
NO (c): Non-adjacent output ports YES: Can work simultaneously
NO: Cannot work simultaneously (need to choose)

| Through \ Drop | Rin#1→D#1 | Rin#2→D#1 | Rin#3→D#1 | Rin#4→D#1 |
|---|---|---|---|---|
| Rin#1→Rout#2 | NO (d) | YES | YES | YES |
| Rin#1→Rout#3 | NO (d) | YES | YES | YES |
| Rin#1→Rout#4 | NO (d) | YES | YES | YES |

NO (d): One input to multiple outputs

YES: Can work simultaneously
NO: Cannot work simultaneously (need to choose)

FIG. 32

| T23 Add/Drop / Through | A#1→Rout#1 & Rin#1→D#1 | A#1→Rout#2 & Rin#2→D#1 | A#1→Rout#3 & Rin#3→D#1 | A#1→Rout#4 & Rin#4→D#1 |
|---|---|---|---|---|
| Rin#1→Rout#2 | NO | NO | YES | NO (P4) |
| Rin#1→Rout#3 | NO | NO (P1) | NO | YES |
| Rin#1→Rout#4 | NO | NO (P2) | NO (P3) | NO |

YES: Can work simultaneously
NO: Cannot work simultaneously (need to choose)

FIG.37

| Add / Through | A#1→Rout#1 | A#1→Rout#2 | A#1→Rout#3 | A#1→Rout#4 |
|---|---|---|---|---|
| Rin#1→Rout#2 | YES | NO | YES | YES |
| Rin#1→Rout#3 | YES | YES | NO | YES |
| Rin#1→Rout#4 | YES | YES | YES | NO |

| T62 Through \ Drop | Rin#1→D#1 | Rin#2→D#1 | Rin#3→D#1 | Rin#4→D#1 |
|---|---|---|---|---|
| Rin#1→Rout#2 | NO | YES | YES | YES |
| Rin#1→Rout#3 | NO | YES | YES | YES |
| Rin#1→Rout#4 | NO | YES | YES | YES |

FIG. 39

| T63 Add/Drop / Through | A#1→Rout#1 & Rin#1→D#1 | A#1→Rout#2 & Rin#2→D#1 | A#1→Rout#3 & Rin#3→D#1 | A#1→Rout#4 & Rin#4→D#1 |
|---|---|---|---|---|
| Rin#1→Rout#2 | NO | NO | YES | YES |
| Rin#1→Rout#3 | NO | YES | NO | YES |
| Rin#1→Rout#4 | NO | YES | YES | NO |

//

OPTICAL CROSS-CONNECT USING WAVELENGTH SELECTIVE SWITCHES

CROSS-REFERENCE TO RELATED APPLICATIONS

This application is based upon and claims the benefits of priority from the prior Japanese Patent Application No. 2006-330120 filed Dec. 7, 2006, the entire contents of which are incorporated herein by reference.

BACKGROUND OF THE INVENTION

1. Field of the Invention

The present invention relates to an optical cross-connect, and more particularly to an optical cross-connect that switches optical signals of N routes (N=1, 2, ... ).

2. Description of the Related Art

Many optical network systems use the wavelength-division multiplexing (WDM) technology to interconnect network nodes such as cities and countries. WDM transmission systems involve various control techniques to, for example, deliver optical signals with different wavelengths to intended destinations, or to add or drop a desired wavelength to/from a desired route of optical signals. The latter is known as "optical add and drop multiplexing" (OADM). Also required is the feature of automatic protection switching, which enables a failed channel to be switched instantly to an alternate channel with a then-available wavelength in the event of a failure between network nodes. Optical cross-connect is a device that offers such optical switching functions, and there is an increased interest in wavelength selective switches (WSS) as a key component to realize optical cross-connects.

FIG. 33 shows the basic structure of a 1-input 3-output (1×3) WSS. The illustrated WSS 40 is formed from a spectroscopic system 41, a lens 42, and a mirror 43. The incoming light through the input port IN is reflected to one of the three output ports OUT1 to OUT3. A desired output port can be selected by varying the tilt angle of the mirror 43.

FIG. 34 shows a structure of a conventional optical cross-connect. The illustrated optical cross-connect 50 is a wavelength cross-connect (WXC) designed to switch four routes each carrying 40 WDM channels, with fixed add wavelengths. The optical cross-connect 50 includes 1×4 WSSs 51-1 to 51-4, 4×1 WSSs 52-1 to 52-4, combiners 53-1 to 53-4, splitters 54-1 to 54-4, WDM amplifiers 55-1 to 55-4 and 56-1 to 56-4, transmitters Tx, and receivers Rx.

Input routes Rin#1 to Rin#4 reach the input ports of corresponding 1×4 WSSs 51-1 to 51-4 through WDM amplifiers 55-1 to 55-4. The outputs of 4×1 WSSs 52-1 to 52-4 are directed to output routes Rout#1 to Rout#4 through WDM amplifiers 56-1 to 56-4. Signals on each add route A#1 to A#4 are entered to input ports of a corresponding combiner 53-1 to 53-4 through 40 transmitters Tx. Each drop route D#1 to D#4 has 40 receivers Rx coupled to the outputs of a corresponding splitter 54-1 to 54-4.

Input and output ports of WSSs are named as shown in the legend of FIG. 34, the order being determined by the structure of a WSS. Such ports of WSSs are connected as follows: Output port OUT1 of the first 1×4 WSS 51-1 is connected to input port IN1 of the second 4×1 WSS 52-2. Output port OUT2 of the WSS 51-1 is connected to input port IN1 of the third 4×1 WSS 52-3. Output port OUT3 of the WSS 51-1 is connected to input port IN1 of the fourth 4×1 WSS 52-4. Output port OUT4 of the WSS 51-1 is connected to input port of the first splitter 54-1.

Output port OUT1 of the second 1×4 WSS 51-2 is connected to input port IN1 of the first 4×1 WSS 52-1. Output port OUT2 of the WSS 51-2 is connected to input port IN2 of the third 4×1 WSS 52-3. Output port OUT3 of the WSS 51-2 is connected to input port IN2 of the fourth 4×1 WSS 52-4. Output port OUT4 of the WSS 51-2 is connected to input port of the second splitter 54-2.

Output port OUT1 of the third 1×4 WSS 51-3 is connected to input port IN2 of the first 4×1 WSS 52-1. Output port OUT2 of the WSS 51-3 is connected to input port IN2 of the second 4×1 WSS 52-2. Output port OUT3 of the WSS 51-3 is connected to input port IN3 of the fourth 4×1 WSS 52-4. Output port OUT4 of the WSS 51-3 is connected to input port of the third splitter 54-3.

Output port OUT1 of the fourth 1×4 WSS 51-4 is connected to input port IN3 of the first 4×1 WSS 52-1. Output port OUT2 of the WSS 51-4 is connected to input port IN3 of the second 4×1 WSS 52-2. Output port OUT3 of the WSS 51-4 is connected to input port IN3 of the third 4×1 WSS 52-3. Output port OUT4 of the WSS 51-4 is connected to input port of the fourth splitter 54-4.

The output of the first combiner 53-1 is connected to input port IN4 of the first 4×1 WSS 52-1. The output port of the second combiner 53-2 is connected to input port IN4 of the second 4×1 WSS 52-2. Likewise, the output of the combiner 53-3 is connected to input port IN4 of the third 4×1 WSS 52-3, and the output of the combiner 53-4 is connected to input port IN4 of the fourth 4×1 WSS 52-4.

This conventional optical cross-connect 50 is unable to change the wavelengths of individual add signals since it uses fixed-wavelength transmitters Tx. The optical cross-connect 50 also has to use expensive WDM amplifiers 55-1 to 55-4 and 56-1 to 56-4 each having a dispersion compensation fiber (DCF) to compensate for the large optical loss of combiners 53-1 to 53-4 and splitters 54-1 to 54-4.

FIG. 35 shows the structure of another conventional optical cross-connect, and FIG. 36 shows four types of WSSs and their input and output port numbers as a legend for WSSs shown in FIG. 35. This optical cross-connect 60 can add optical signals with desired wavelengths, unlike the optical cross-connect 50 of FIG. 34.

The optical cross-connect 60 has four 1×7 WSSs 61-1 to 61-4 on the input side to receive incoming signals from input routes Rin#1 to Rin#4. Likewise, it has four 1×4 WSSs 66-1 to 66-4 to receive add signals from add routes A#1 to A#4. On the output side, four 7×1 WSSs 62-1 to 62-4 are employed to send signals to output routes Rout#1 to Rout#4. For drop routes D#1 to D#4, four 4×1 WSSs 67-1 to 67-4 are placed.

Those WSSs are connected with each other in the following way: Output port OUT1 of the first 1×7 WSS 61-1 is connected to input port IN1 of the second 7×1 WSS 62-2. Output port OUT2 of the WSS 61-1 is connected to input port IN1 of the third 7×1 WSS 62-3. Output port OUT3 of the WSS 61-1 is connected to input port IN1 of the fourth 7×1 WSS 62-4. Output port OUT4 of the WSS 61-1 is connected to input port IN1 of the first 4×1 WSS 67-1. Output port OUT5 of the WSS 61-1 is connected to input port IN1 of the second 4×1 WSS 67-2. Output port OUT6 of the WSS 61-1 is connected to input port IN1 of the third 4×1 WSS 67-3. Output port OUT7 of the WSS 61-1 is connected to input port IN1 of the fourth 4×1 WSS 67-4.

Output port OUT1 of the second 1×7 WSS 61-2 is connected to input port IN1 of the first 7×1 WSS 62-1. Output port OUT2 of the WSS 61-2 is connected to input port IN2 of the third 7×1 WSS 62-3. Output port OUT3 of the WSS 61-2 is connected to input port IN2 of the fourth 7×1 WSS 62-4.

Output port OUT4 of the WSS 61-2 is connected to input port IN2 of the first 4×1 WSS 67-1. Output port OUT5 of the WSS 61-2 is connected to input port IN2 of the second 4×1 WSS 67-2. Output port OUT6 of the WSS 61-2 is connected to input port IN2 of the third 4×1 WSS 67-3. Output port OUT7 of the WSS 61-2 is connected to input port IN2 of the fourth 4×1 WSS 67-4.

Output port OUT1 of the third 1×7 WSS 61-3 is connected to input port IN2 of the first 7×1 WSS 62-1. Output port OUT2 of the WSS 61-3 is connected to input port IN2 of the third 7×1 WSS 62-3. Output port OUT3 of the WSS 61-3 is connected to input port IN3 of the fourth 7×1 WSS 62-4. Output port OUT4 of the WSS 61-3 is connected to input port IN3 of the first 4×1 WSS 67-1. Output port OUT5 of the WSS 61-3 is connected to input port IN3 of the second 4×1 WSS 67-2. Output port OUT6 of the WSS 61-3 is connected to input port IN3 of the third 4×1 WSS 67-3. Output port OUT7 of the WSS 61-3 is connected to input port IN3 of the fourth 4×1 WSS 67-4.

Output port OUT1 of the fourth 1×7 WSS 61-4 is connected to input port IN3 of the first 7×1 WSS 62-1. Output port OUT2 of the WSS 61-4 is connected to input port IN3 of the second 7×1 WSS 62-2. Output port OUT3 of the WSS 61-4 is connected to input port IN3 of the third 7×1 WSS 62-3. Output port OUT4 of the WSS 61-4 is connected to input port IN4 of the first 4×1 WSS 67-1. Output port OUT5 of the WSS 61-4 is connected to input port IN4 of the second 4×1 WSS 67-2. Output port OUT6 of the WSS 61-4 is connected to input port IN4 of the third 4×1 WSS 67-3. Output port OUT7 of the WSS 61-4 is connected to input port IN4 of the fourth 4×1 WSS 67-4.

Output port OUT1 of the first 1×4 WSS 66-1 is connected to input port IN4 of the first 7×1 WSS 62-1. Output port OUT2 of the WSS 66-1 is connected to input port IN4 of the second 7×1 WSS 62-2. Output port OUT3 of the WSS 66-1 is connected to input port IN4 of the third 7×1 WSS 62-3. Output port OUT4 of the WSS 66-1 is connected to input port IN4 of the fourth 7×1 WSS 62-4.

Output port OUT1 of the second 1×4 WSS 66-2 is connected to input port IN5 of the first 7×1 WSS 62-1. Output port OUT2 of the WSS 66-2 is connected to input port IN5 of the second 7×1 WSS 62-2. Output port OUT3 of the WSS 66-2 is connected to input port IN5 of the third 7×1 WSS 62-3. Output port OUT4 of the WSS 66-2 is connected to input port IN5 of the fourth 7×1 WSS 62-4.

Output port OUT1 of the third 1×4 WSS 66-3 is connected to input port IN6 of the first 7×1 WSS 62-1. Output port OUT2 of the WSS 66-3 is connected to input port IN6 of the second 7×1 WSS 62-2. Output port OUT3 of the WSS 66-3 is connected to input port IN6 of the third 7×1 WSS 62-3. Output port OUT4 of the WSS 66-3 is connected to input port IN6 of the fourth 7×1 WSS 62-4.

Output port OUT1 of the fourth 1×4 WSS 66-4 is connected to input port IN7 of the first 7×1 WSS 62-1. Output port OUT2 of the WSS 66-4 is connected to input port IN7 of the second 7×1 WSS 62-2. Output port OUT3 of the WSS 66-4 is connected to input port IN7 of the third 7×1 WSS 62-3. Output port OUT4 of the WSS 66-4 is connected to input port IN7 of the fourth 7×1 WSS 62-4.

For the first add route A#1, the optical cross-connect 60 has forty wavelength-tunable transmitters Txv-1 to Txv-40, five 8×1 WSSs 63a-1 to 63a-5, a 5×1 WSS 64-1, and a WDM amplifier 65-1. The forty transmitters Txv-1 to Txv-40 transmit forty optical signals, respectively. Each WSS 63a-1 to 63a-5 receives eight out of forty optical signals from the transmitters Txv-1 to Txv-40 and selectively outputs one optical signal to the 5×1 WSS 64-1. The 5×1 WSS 64-1 then chooses one optical signal from among five optical signals received from the five 8×1 WSSs 63a-1 to 63a-5. The WDM amplifier 65-1 amplifies the output of this WSS 64-1 before feeding it as an add signal to the first 1×4 WSS 66-1. Other three add routes A#2 to A#4 have the same hardware structure as the first add route A#1 described above.

For the first drop route D#1, the optical cross-connect 60 has a WDM amplifier 68-1, a 1×5 WSS 69-1, and five 1×8 WSSs 70a-1 to 70a-5, and forty receivers Rx-1 to Rx-40. The WDM amplifier 68-1 amplifies a drop signal produced by the first 4×1 WSS 67-1. Five outputs of the WSS 69-1 are connected to five input ports of different 1×8 WSSs 70a-1 to 70a-5 to route the drop signal to any one of their forty output ports as specified. Eight outputs of the first 1×8 WSS 70a-1 are directed to a group of receivers Rx-1 to Rx-8, as are the outputs of the second 1×8 WSS 70a-2 to a subsequent group of receivers Rx-9 to Rx-16. Likewise, other three 1×8 WSSs 70a-3 to 70a-5 provide their outputs to corresponding receiver groups Rx-17 to Rx-24, Rx-25 to Rx-32, and Rx-33 to Rx-40. Note that only one of eight signals of each group carries active drop signal information. Each receiver Rx-1 to Rx-40 receives an optical drop signal (if present). Other three drop routes D#2 to D#4 have the same hardware structure as the first drop route D#1.

The number of WSS ports on the input and output routes may be increased or decreased depending on how many routes are to be switched. In the case where the network system needs more wavelengths in WDM transmission, the WSSs on add and drop routes have to be replaced to provide more ports.

The above conventional optical cross-connect 60 realizes the selective add-wavelength WXC functions by combining 1×7/7×1 WSSs, 1×4/4×1 WSSs, 1×8/8×1 WSSs, and 1×5/5×1 WSSs, but without using optical combiners or splitters. Like the one shown in FIG. 34, the optical cross-connect 60 of FIG. 35 can switch cross-connections between four routes each having 40 WDM channels. For example, the WSSs 63a-1 to 63a-5 and 64-1 on the first add route A#1 perform fast switching to add 40-ch WDM signals to a desired output route through the WDM amplifier 65-1 and 1×4 WSS 66-1.

As an example of such conventional optical cross-connecting techniques, Japanese Patent Application Publication No. 2004-343231, paragraphs 0017 to 0019, FIG. 1, proposes an optical cross-connect having input and output ports for individual channels to enable interface with existing network facilities.

The above-described architectures of conventional optical cross-connects may not be optimal in terms of how they use WSSs. Specifically, the optical cross-connect 60 of FIG. 35 includes many WSSs in its add/drop sections. This design is advantageous over the optical cross-connect 50 of FIG. 34 in its smaller signal loss since no optical combiners or splitters are required. It also eliminates the need for costly WDM amplifiers with DCF. On the other hand, the increased use of WSSs also means increased product cost, as well as an increased number of interconnections between them, thus making a cross-connect device more complex and larger.

The conventional optical cross-connect 60 provides various switching patterns for optical cross-connection, and many of them can work simultaneously. In reality, however, the simultaneity of cross-connections is not always required in real-world applications. FIGS. 37 and 38 show tables T61 and T62 representing the simultaneous feasibility of optical cross-connections that the optical cross-connect 60 of FIG. 35 can or cannot provide. Specifically, table T61 summarizes simultaneous feasibility of optical cross-connections between input route Rin#1 and add route A#1. Table T62, on the other hand, summarizes the same for cross-connections between input route Rin#1 and drop route D#1.

Table entries having a value of "YES" mean that the corresponding switching paths can work simultaneously. The top-left entry of table T61, for example, is marked "YES," indicating that an add switching path from add route A#1 to output route Rout#1 can work together with a through switching path from input route Rin#1 to output route Rout#2.

Table entries having a value of "NO" indicate that the corresponding combination of switching paths cannot work simultaneously. Reversely stated, one of those paths can work selectively. See the entry at column 2, row 1 of table T61, for example. This entry is marked "NO," meaning that an add switching path from add route A#1 to output route Rout#2 cannot work together with a through switching path from input route Rin#1 to output route Rout#2. This is because these two paths collide at an output port of the second 7×1 WSS 62-2. The other table T62 is supposed to be interpreted in the same way.

FIG. 39 shows yet another table representing simultaneous feasibility of optical cross-connections. This table T63 is a logical product of table T61 and table T62, which is produced by performing a logical operation on each corresponding pair of entries of those two tables. Specifically, let x and y represent respectively the values of table T61 and table T62 at a particular column and row. The logical product of two table entries (x, y) takes a value of "YES" if (x,y)=(YES,YES), or a value of "NO" if (x,y)=(YES,NO) or (NO,YES) or (NO, NO). The resulting value is then set to a corresponding entry of table T63.

Referring to table T63, the entries having a value of "YES" indicate that the corresponding through switching path and add/drop switching paths can work simultaneously. See the entry at column 3, row 1, for example. This entry has a value of "YES," meaning that a through switching path from input route Rin#1 to output route Rout#2, an add switching path from add route A#1 to output route Rout#3, and a drop switching path from input route Rin#3 to drop route D#1 can all work at the same time.

Other entries of table T63 have a value of "NO" to indicate that either the corresponding through switching path or the corresponding add/drop switching paths can work selectively. See the top-left entry of table T63, for example. This table entry indicates that the optical cross-connect 60 does not allow simultaneous use of a through switching path from input route Rin#1 to output route Rout#2, an add switching path from add route A#1 to output route Rout#1, and a drop switching path from input route Rin#1 to drop route D#1. That table entry, however, implies that either the through switching path alone or the add/drop switching paths can be implemented.

In reality, however, it may not be necessary to make available every combination of a through path and add/drop paths for simultaneous use. Rather, most cases require either the former or the latter alone. Table T63, however, shows many switching patterns marked "YES." This means that the conventional optical cross-connect 60 is not optimized as to the simultaneity of its switching paths. The entire circuit of an optical cross-connect will be smaller in size if it is possible to reduce some simultaneous switching patterns of through and add/drop paths (which means reducing "YES" and increasing "NO" in table T63).

SUMMARY OF THE INVENTION

In view of the foregoing, it is an object of the present invention to provide an optimally-sized optical cross-connect that switches optical signal paths with a minimum number of wavelength selective switches and their interconnections.

To accomplish the above object, the present invention provides an optical cross-connect switching optical signals of N routes (N=1, 2, . . . ). This optical cross-connect has 2-input N-output (2×N) wavelength selective switches coupled respectively to N input routes, and N-input 2-output (N×2) wavelength selective switches coupled respectively to N output routes. One input port of each 2×N wavelength selective switch receives an optical signal from a corresponding input route, while the other input port receives an optical add signal from a corresponding add route. One output port of each N×2 wavelength selective switch outputs an optical signal to a corresponding output route, while the other output port outputs an optical drop signal to a corresponding drop route.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 18 to 20 show tables representing simultaneous feasibility of optical cross-connections.

FIGS. 30 to 32 show tables representing simultaneous feasibility of optical cross-connections.

FIGS. 37 to 39 show tables representing simultaneous feasibility of optical cross-connections.

DESCRIPTION OF THE PREFERRED EMBODIMENTS

Figure 1:
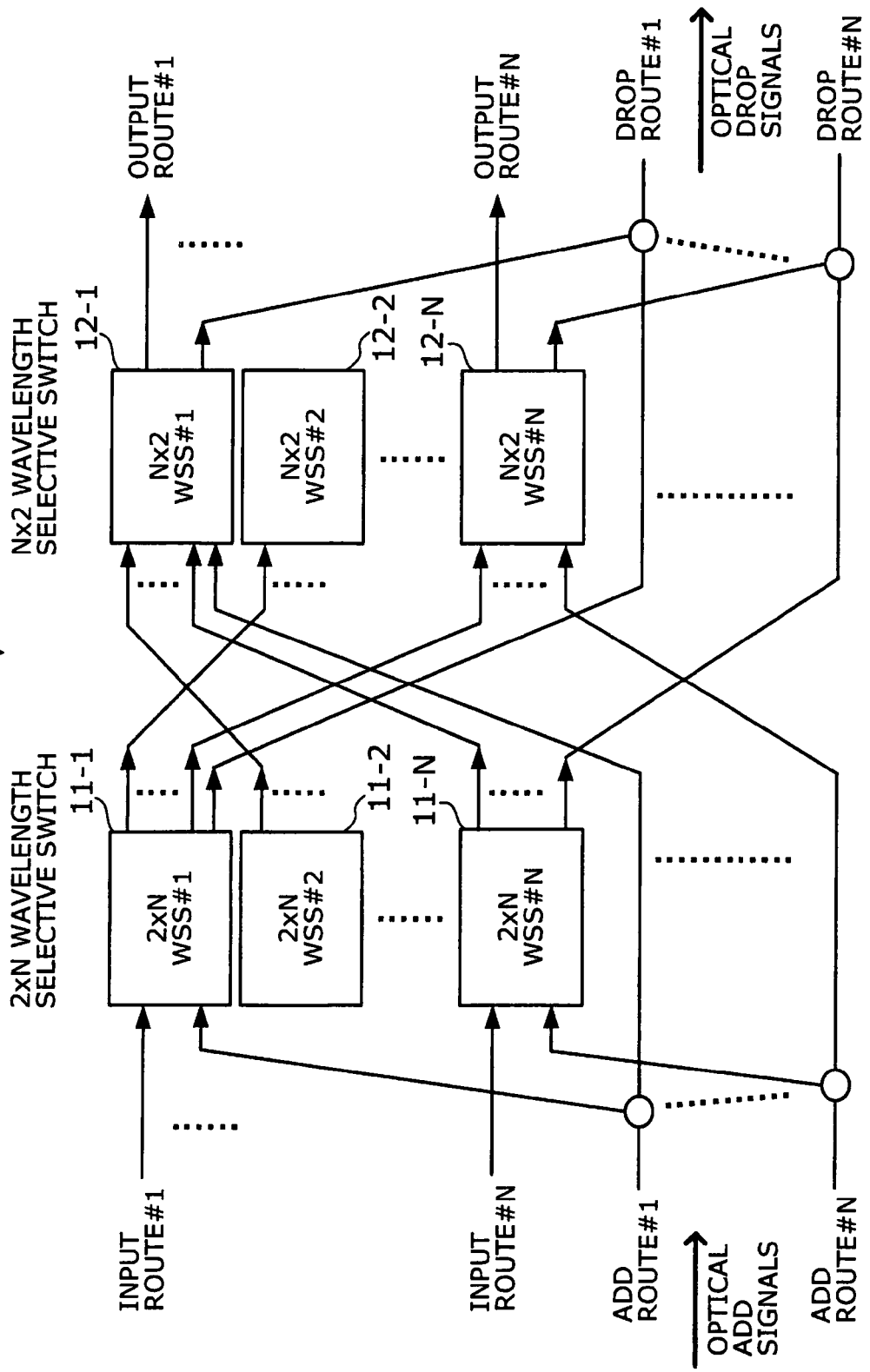
FIG. 1 is a conceptual view of an optical cross-connect according to the present invention.

Preferred embodiments of the present invention will be described below with reference to the accompanying drawings, wherein like reference numerals refer to like elements throughout.

FIG. 1 is a conceptual view of an optical cross-connect according to the present invention. This optical cross-connect 1 switches optical signals between N routes, which include input routes, N output routes, N add routes, and N drop routes (N=1, 2, . . . ). To perform this function, the optical cross-connect 1 includes (a) 2-input N-output (2×N) wavelength selective switches (WSS) 11-1 to 11-N coupled respectively to N input routes, and (b) N-input 2-output (N×2) wavelength selective switches 12-1 to 12-N coupled respectively to N output routes.

The nth 2×N wavelength selective switch (shown as 2×N WSS#n in FIG. 1) (n=1, 2, . . . N) coupled to the nth input route (input route #n) receives an optical signal from the nth input route at its first input port and an optical add signal from the nth add route at its second input port.

The nth N×2 wavelength selective switch (shown as N×2 WSS#n in FIG. 1) coupled to the nth output route (output route #n) outputs an optical signal from its first output port to the nth output route and an optical drop signal from its second output port to the nth drop route.

Wavelength Selective Switch

Figure 2:
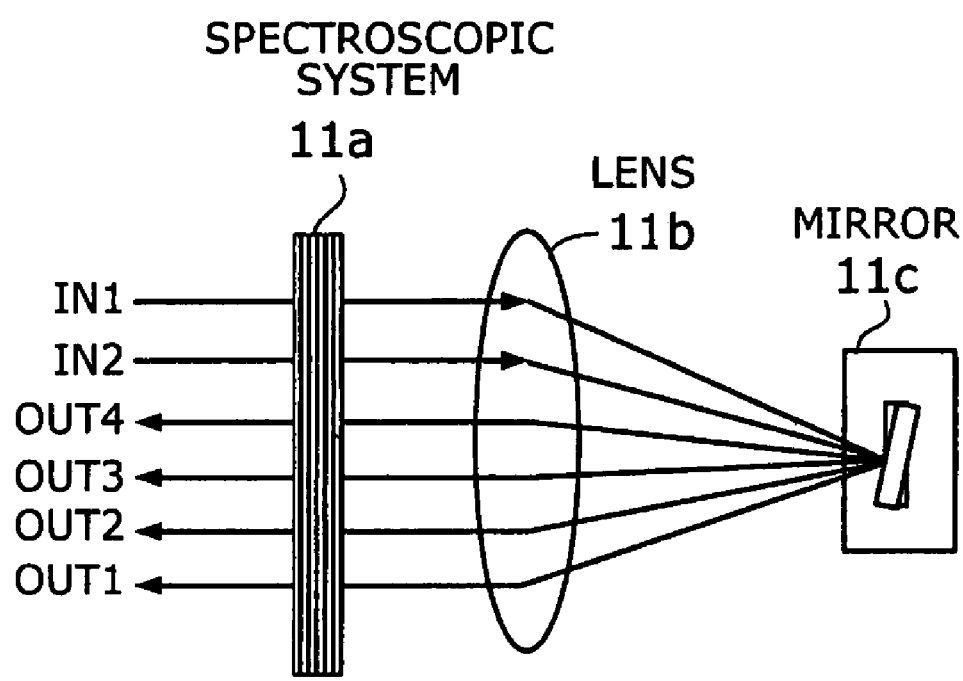
FIG. 2 shows a basic structure of 2×N WSS.
Figure 3:
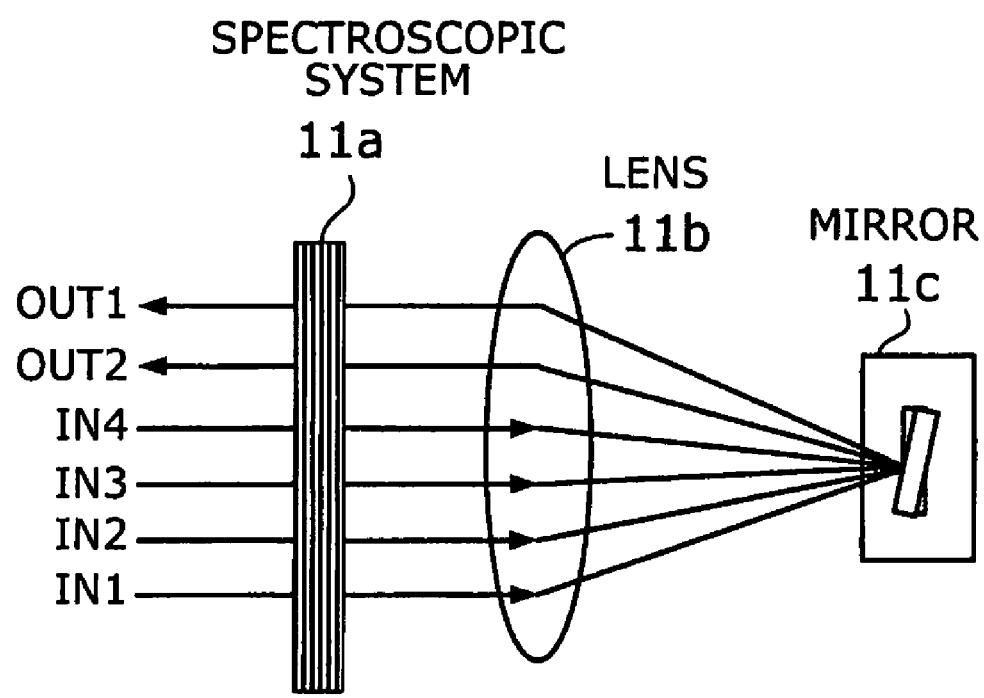
FIG. 3 shows a basic structure of N×2 WSS.

Referring now to FIGS. 2 and 3, this section will describe the basic structure of 2×N and N×2 WSSs used in the proposed optical cross-connect 1. Specifically, FIG. 2 shows a 2×N WSS 11-1, and FIG. 3 shows an N×2 WSS 12-1. Both WSSs 11-1 and 12-1 have a spectroscopic system 11a, a lens 11b, and a mirror 11c. They select specified input-output pairs by varying the angle of the mirror 11c.

Optical signals entered to two adjacent input ports of a WSS come out of two adjacent output ports at symmetric positions to the respective input ports. This is an inherent nature of WSS structure. Accordingly, if the mirror 11c is adjusted so as to direct one input signal to a particular output port, then it automatically determines at which output port an adjacent input signal will appear. The 2×N WSS 11-1, for example, has two input ports IN1 and IN2. Suppose that the 2×N WSS 11-1 directs a signal from the outermost input port IN1 to the outermost output port OUT1. This automatically means that a signal entered to the next input port IN2 goes to an inner output port OUT2. (Other output ports OUT3 and OUT4 never output this signal.) For another example, suppose that the 2×N WSS 11-1 is adjusted to direct a signal from the outermost input port IN1 to the second output port OUT2. In this case, a signal entered to the other input port IN2 goes to the third output port OUT3. (Other output ports OUT1 and OUT4 never output this signal.)

The N×2 WSS 12-1 of FIG. 3 operates in a similar way. Suppose, for example, that it is configured to direct a signal from the outermost input port IN1 to the outermost output port OUT1. In this case, the next output port OUT2 should be dedicated to no other than the second input port IN2 (i.e., other input ports IN3 and IN4 cannot be assigned to the output port OUT2). Likewise, if the N×2 WSS 12-1 is configured to direct a signal from the second input port IN2 to the outermost output port OUT1, then the second output port OUT2 should be dedicated to no other than the third input port IN3 (i.e., other input ports IN1 and IN4 cannot be assigned to the output port OUT2).

As can be seen from the above examples, a WSS reflects optical signals from two adjacent input ports to two adjacent output ports in a particular way. That is, one input port and its corresponding output port are symmetric to each other with respect to a line defined by the tilt of the mirror 11c, as are the other input port and its corresponding output port with respect to the same line of symmetry. Because of this nature of WSS, several patterns of optical switching cannot be put into practice by the use of a WSS. FIGS. 4 to 8 illustrate such infeasible switching patterns, assuming the use of a 2×N WSS.

Figure 4:
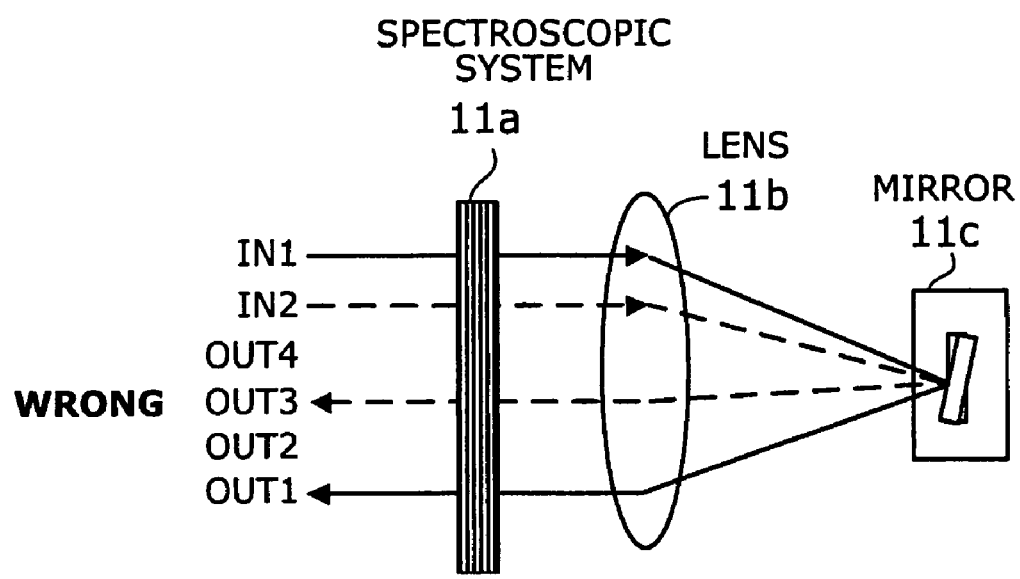
FIGS. 4 to 8 show various cases where 2×N WSS cannot switch signals properly.
Figure 5:
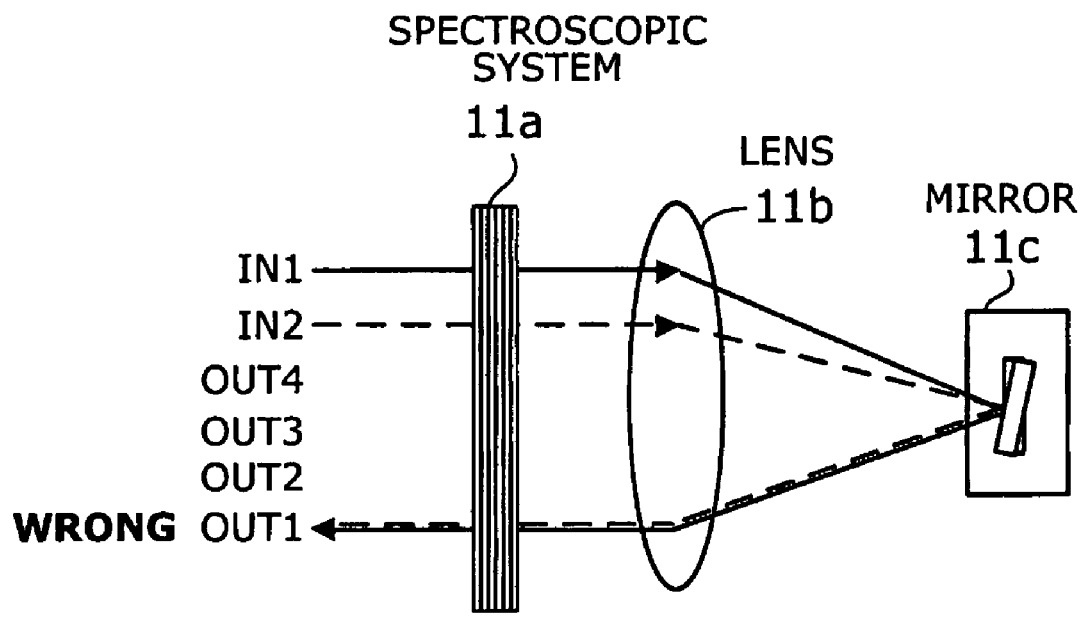

Specifically, FIG. 4 shows an infeasible switching pattern where the output ports are not immediately adjacent with each other. FIG. 5 shows another infeasible switching pattern where input ports are mapped not to different output ports, but to a single output port. Because of the symmetry of input ports and corresponding output ports explained earlier, neither the switching pattern of FIG. 4 nor that of FIG. 5 can be realized.

Figure 7:
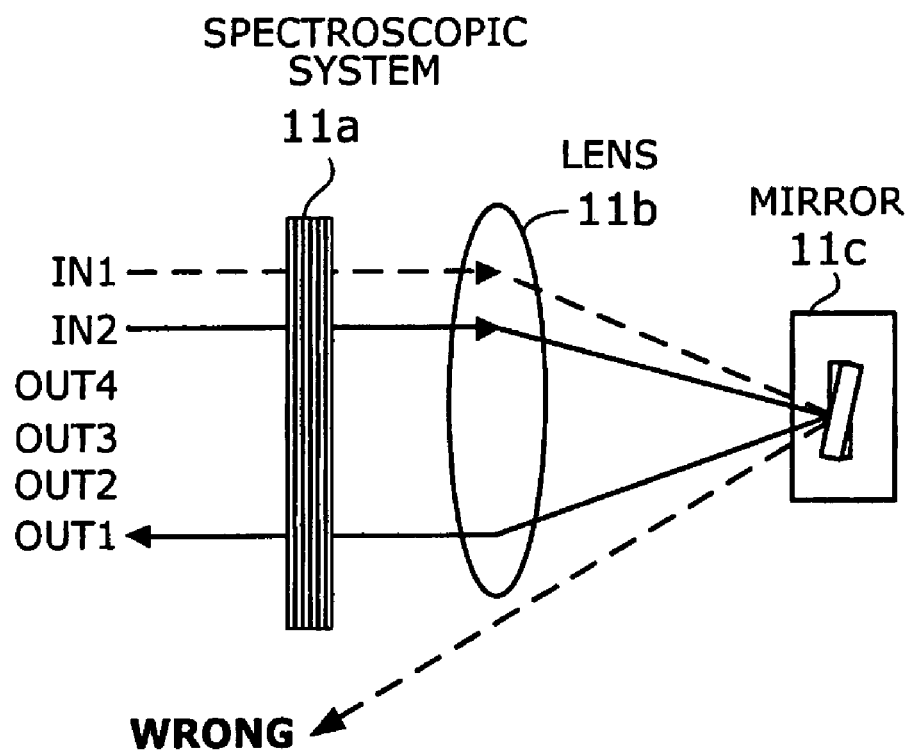
Figure 8:
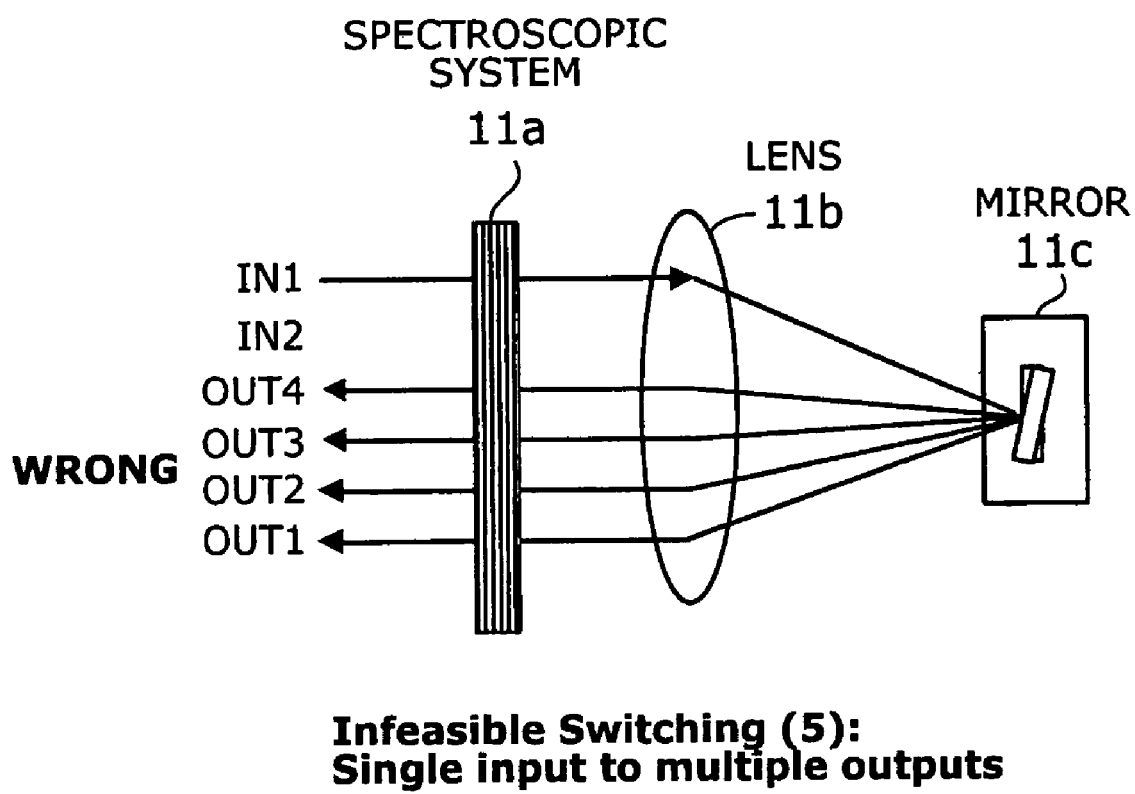

Other infeasible switching patterns are when: two optical paths are twisted (FIG. 6); no output port exists at a symmetric position to the input port (FIG. 7); a single input is mapped to multiple outputs (FIG. 8).

Figure 6:
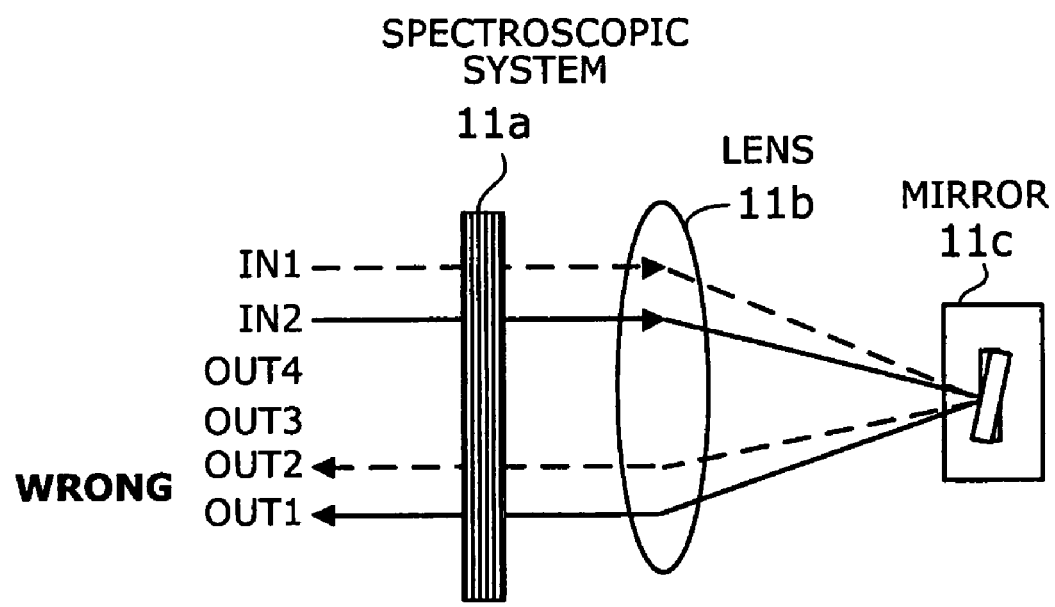

More specifically, FIG. 6 shows a case where one input signal entered to input port IN1 appears at output port OUT2 while the other input signal entered to input port IN2 appears at output OUT1. This switching pattern is not feasible since the two rays can never be reflected by the same mirror 11c in that way. (The switching would work fine if it was output port OUT3 where the signal entering IN2 comes out.) As this example shows, the WSS does not allow two internal optical paths to intersect with each other.

FIG. 7 shows a case where one signal entering the second input port IN2 comes out of the outermost output port OUT1. In this case another signal entered to input port IN1 goes to where no output ports are present, hence another infeasible switching pattern. Shown in FIG. 8 is another infeasible pattern, where the WSS cannot distribute one input to multiple output ports because of its inherent structure.

Optical Cross-Connect

Figure 9:
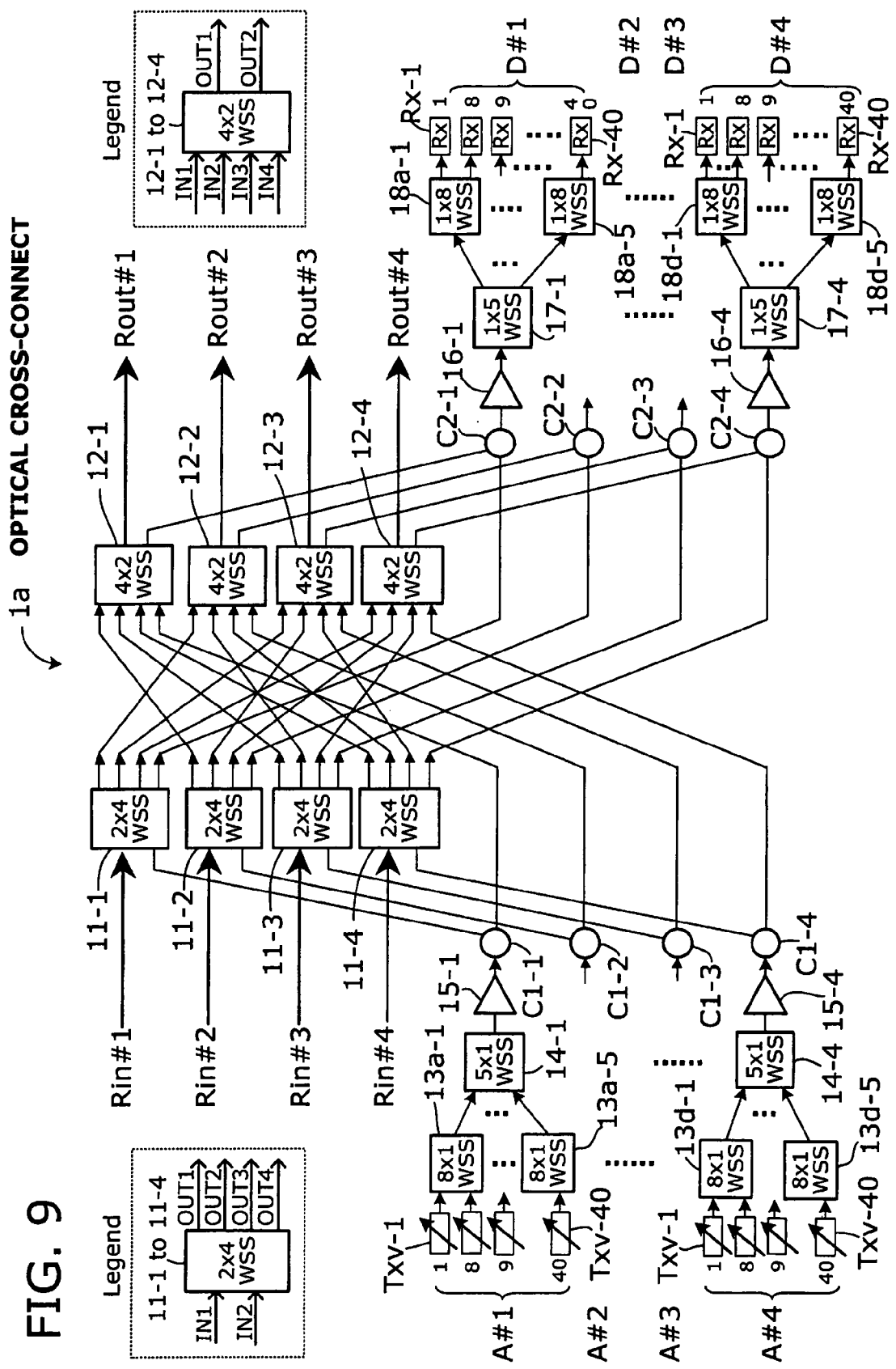
FIG. 9 shows a structure of an optical cross-connect according to an embodiment of the present invention.

This section describes a more specific embodiment of the optical cross-connect 1 according to the present invention. FIG. 9 shows an optical cross-connect 1a according to an embodiment of the present invention. This optical cross-connect 1a performs switching between four routes each carrying 40 WDM channels. Four 2×4 WSSs 11-1 to 11-4 are coupled to input routes Rin#1 to Rin#4, and four 4×2 WSSs 12-1 to 12-4 are coupled to output routes Rout#1 to Rout#4.

Output ports OUT1 to OUT3 of four 2×4 WSSs 11-1 to 11-4 are connected to input ports of four 4×2 WSSs 12-1 to 12-4. Specifically, the connection between output and input ports are as follows:

Output port OUT1 of the first 2×4 WSS 11-1 is connected to input port IN1 of the second 4×2 WSS 12-2. Output port OUT2 of the WSS 11-1 is connected to input port IN1 of the third 4×2 WSS 12-3. Output port OUT3 of the WSS 11-1 is connected to input port IN1 of the fourth 4×2 WSS 12-4.

Output port OUT1 of the second 2×4 WSS 11-2 is connected to input port IN1 of the first 4×2 WSS 12-1. Output port OUT2 of WSS 11-2 is connected to input port IN2 of third 4×2 WSS 12-3. Output port OUT3 of the WSS 11-2 is connected to input port IN2 of the fourth 4×2 WSS 12-4.

Output port OUT1 of the third 2×4 WSS 11-3 is connected to input port IN2 of the first 4×2 WSS 12-1. Output port OUT2 of the WSS 11-3 is connected to input port IN2 of the second 4×2 WSS 12-2. Output port OUT3 of the WSS 11-3 is connected to input port IN3 of the fourth 4×2 WSS 12-4.

Output port OUT1 of the fourth 2×4 WSS 11-4 is connected to input port IN3 of the first 4×2 WSS 12-1. Output port OUT2 of the WSS 11-4 is connected to input port IN3 of the second 4×2 WSS 12-2. Output port OUT3 of the WSS 11-4 is connected to input port IN3 of the third 4×2 WSS 12-3.

In the add section shown in the lower-left quarter of FIG. 9, the optical cross-connect 1a has the following elements to select an add signal on the first add route A#1: forty wavelength-tunable transmitters Txv-1 to Txv-40, five 8×1 WSSs 13a-1 to 13a-5, a 5×1 WSS 14-1, an optical amplifier (WDM amplifier) 15-1, and a 1×2 coupler C1-1. The forty transmitters Txv-1 to Txv-40 transmit forty optical signals, respectively. Each 8×1 WSS 13a-1 to 13a-5 receives eight out of forty optical signals from the transmitters Txv-1 to Txv-40 and outputs one selected optical signal to the subsequent 5×1 WSS 14-1. The 5×1 WSS 14-1 then chooses one optical signal from among five optical signals received from the five 8×1 WSSs 13*a*-1 to 13*a*-5. The optical amplifier 15-1 amplifies the output of this WSS 14-1 when sending it as an add signal to the coupler C1-1. Other three add routes A#2 to A#4 have the same hardware structure as the first add route A#1 described above.

The 1×2 couplers C1-1 to C1-4 on the add side split each given add signal into two branches to distribute the signal to two different elements. Specifically, the coupler C1-1 for add route A#1 distributes its add signal to input port IN2 of the first 2×4 WSS 11-1 and input port IN4 of the first 4×2 WSS 12-1. Likewise, the coupler C1-2 distributes an add signal of add route A#2 to input port IN2 of the second 2×4 WSS 11-2 and input port IN4 of the second 4×2 WSS 12-2. The coupler C1-3 distributes an add signal of add route A#3 to input port IN2 of the third 2×4 WSS 11-3 and input port IN4 of the third 4×2 WSS 12-3. The coupler C1-4 distributes an add signal of add route A#4 to input port IN2 of the fourth 2×4 WSS 11-4 and input port IN4 of the fourth 4×2 WSS 12-4.

The 2×1 couplers C2-1 to C2-4 on the drop side combine two optical paths into one to produce a drop signal. Specifically, the coupler C2-1 for drop route D#1 receives signals from output port OUT4 of the first 2×4 WSS 11-1 and output port OUT2 of the first 4×2 WSS 12-1. The resulting drop signal contains one of these two signals that is active. Likewise, the coupler C2-2 combines signals from output port OUT4 of the second 2×4 WSS 11-2 and output port OUT2 of the second 4×2 WSS 12-2, thereby producing a drop signal for drop route D#2. The coupler C2-3 combines signals from output port OUT4 of the third 2×4 WSS 11-3 and output port OUT2 of the third 4×2 WSS 12-3, thereby producing a drop signal for drop route D#3. The coupler C2-4 combines signals from output port OUT4 of the fourth 2×4 WSS 11-4 and output port OUT2 of the fourth 4×2 WSS 12-4, thereby producing a drop signal for drop route D#4.

In the drop section shown in the lower-right quarter of FIG. 9, the optical cross-connect 1*a* includes the following elements for drop route D#1: a 2×1 coupler C2-1, an optical amplifier (WDM amplifier) 16-1, a 1×5 WSS 17-1, five 1×8 WSSs 18*a*-1 to 18*a*-5, and forty receivers Rx-1 to Rx-40. The optical amplifier 16-1 amplifies a drop signal supplied from the corresponding coupler C2-1. The 1×5 WSS 17-1 has five output ports connected respectively to the input ports of different 1×8 WSSs 18*a*-1 to 18*a*-5. These WSSs 18*a*-1 to 18*a*-5 bring the drop signal to any one of their forty output ports as specified. Eight outputs of the first 1×8 WSS 18*a*-1 are directed to a group of receivers Rx-1 to Rx-8, as are the outputs of the second 1×8 WSS 18*a*-2 to a subsequent group of receivers Rx-9 to Rx-16. Likewise, other three 1×8 WSSs 18*a*-3 to 18*a*-5 provide their outputs to corresponding receiver groups Rx-17 to Rx-24, Rx-25 to Rx-32, and Rx-33 to Rx-40. Each receiver Rx-1 to Rx-40 receives an optical drop signal (if supplied). Other three drop routes D#2 to D#4 have the same hardware structure as the first drop route D#1.

Switching Between Input Route and Add Route (1)

Figure 10:
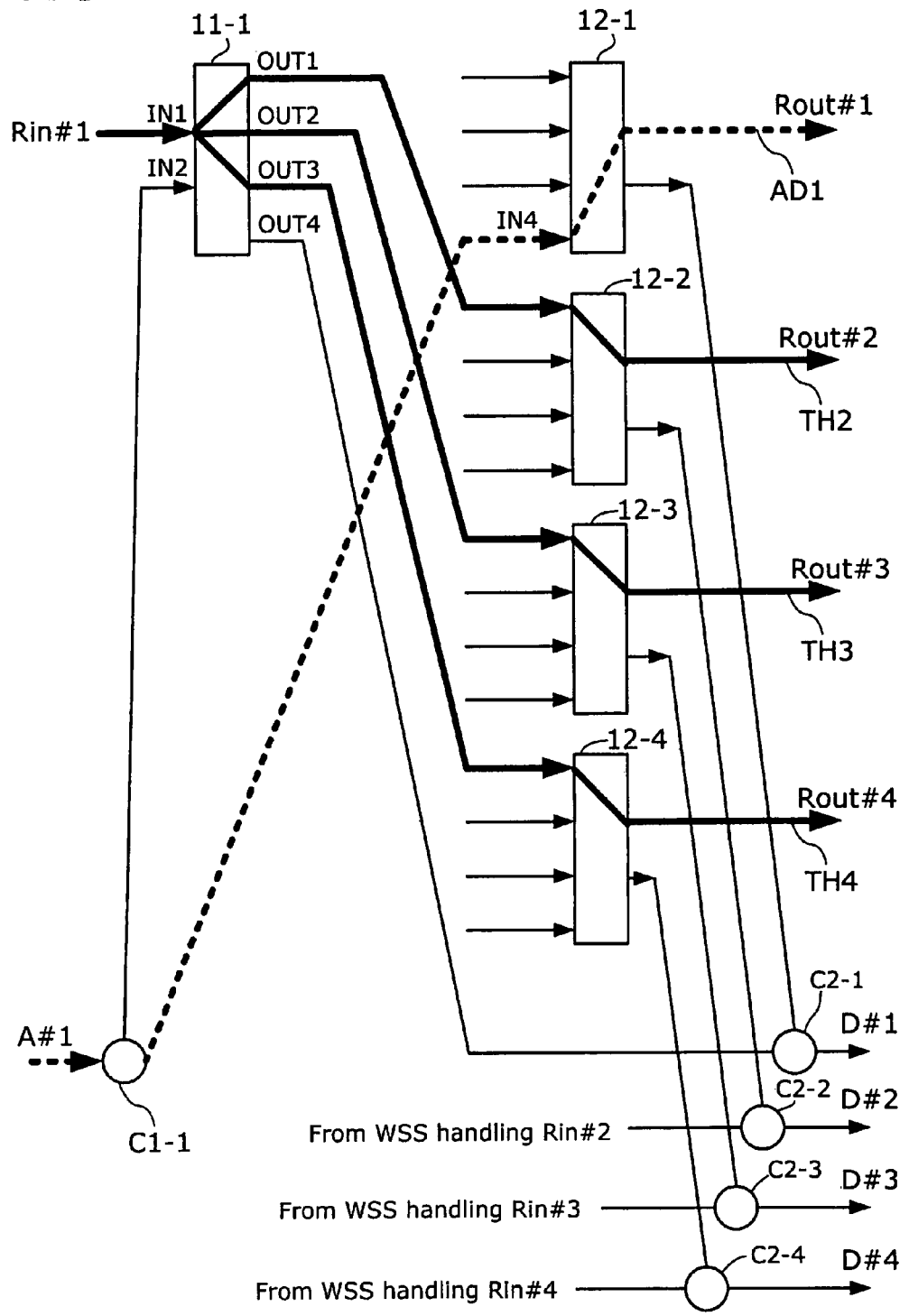
FIGS. 10 to 17 show various switching paths that an optical cross-connect can produce.

Referring now to FIGS. 10 to 13, this section will describe how the optical cross-connect 1*a* switches optical signals of input route Rin#1 and add route A#1. FIG. 10 shows an example of switching paths that the optical cross-connect 1*a* can produce. The bold dotted line indicates an add path AD1 from add route A#1 to output route Rout#1. The bold solid lines represent the following three through paths: TH2 from input route Rin#1 to output route Rout#2; TH3 from input route Rin#1 to output route Rout#3; and TH4 from input route Rin#1 to output route Rout#4.

Referring back to FIG. 9, the optical cross-connect 1*a* provides two paths for delivering an add signal to a specific output route. One path goes from a coupler C1-1 to C1-4 to input port IN2 of a 2×4 WSS 11-1 to 11-4, and then through a selected 4×2 WSS 12-1 to 12-4. This path is chosen in the case where the add route number is different from the output route number of interest. The other path goes from a coupler C1-1 to C1-4 to input port IN4 of a corresponding 4×2 WSS 12-1 to 12-4. This path is chosen in the case where the add route number is the same as the output route number of interest.

Referring again to the case of FIG. 10, an add signal received from add route A#1 goes to output route Rout#1. This add signal is directed to input port IN4 of the first 4×2 WSS 12-1 since the add route number #1 equals the output route number #1. The selected add path AD1 reaches the intended output route Rout#1 without interfering with the through path TH2, TH3, or TH4. Thus, in the case shown in FIG. 10, the add path AD1 can work simultaneously with any one of the through paths TH2, TH3, and TH4.

Figure 11:
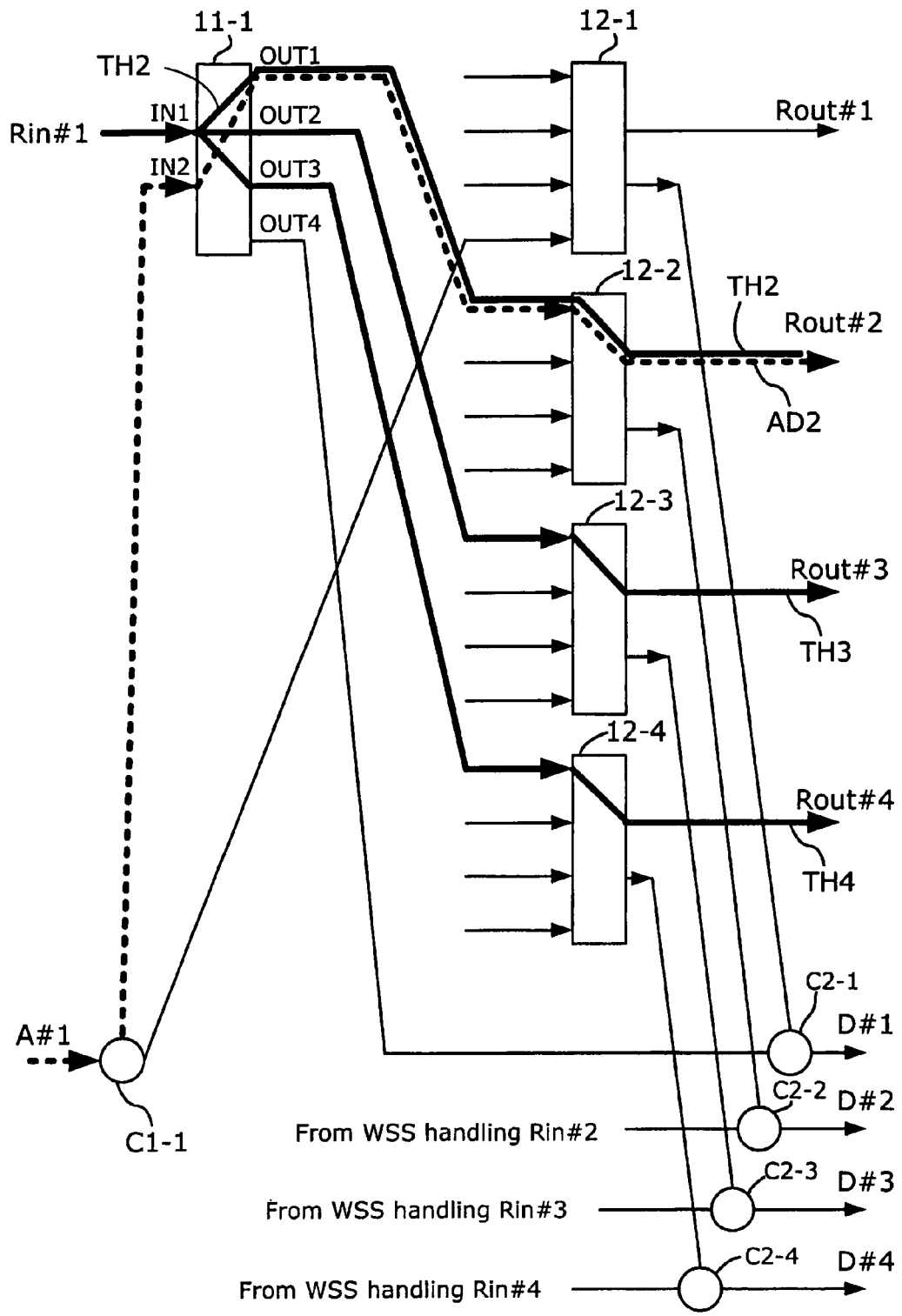

FIG. 11 shows another example of switching paths. The bold dotted line indicates an add path AD2 from add route A#1 to output route Rout#2. The bold solid lines represent the following three through paths: TH2 from input route Rin#1 to output route Rout#2; TH3 from input route Rin#1 to output route Rout#3; and TH4 from input route Rin#1 to output route Rout#4.

In the case shown in FIG. 11, the add path AD2 cannot work simultaneously with the through path TH2. This is because the WSS 11-1 is inherently unable to route optical signals from two input ports IN1 and IN2 to a single output port OUT1 (see FIG. 5 for the infeasible pattern of two paths colliding at an output port). The add path AD2 cannot work simultaneously with the through path TH3 either. This is because the WSS 11-1 is inherently unable to route one optical signal from input port IN1 to output port OUT2 when another optical signal goes from input port IN2 to output port OUT1 (see FIG. 6 for the case where two paths being twisted). For the same reason, the add path AD2 cannot work simultaneously with the through path TH4.

Figure 12:
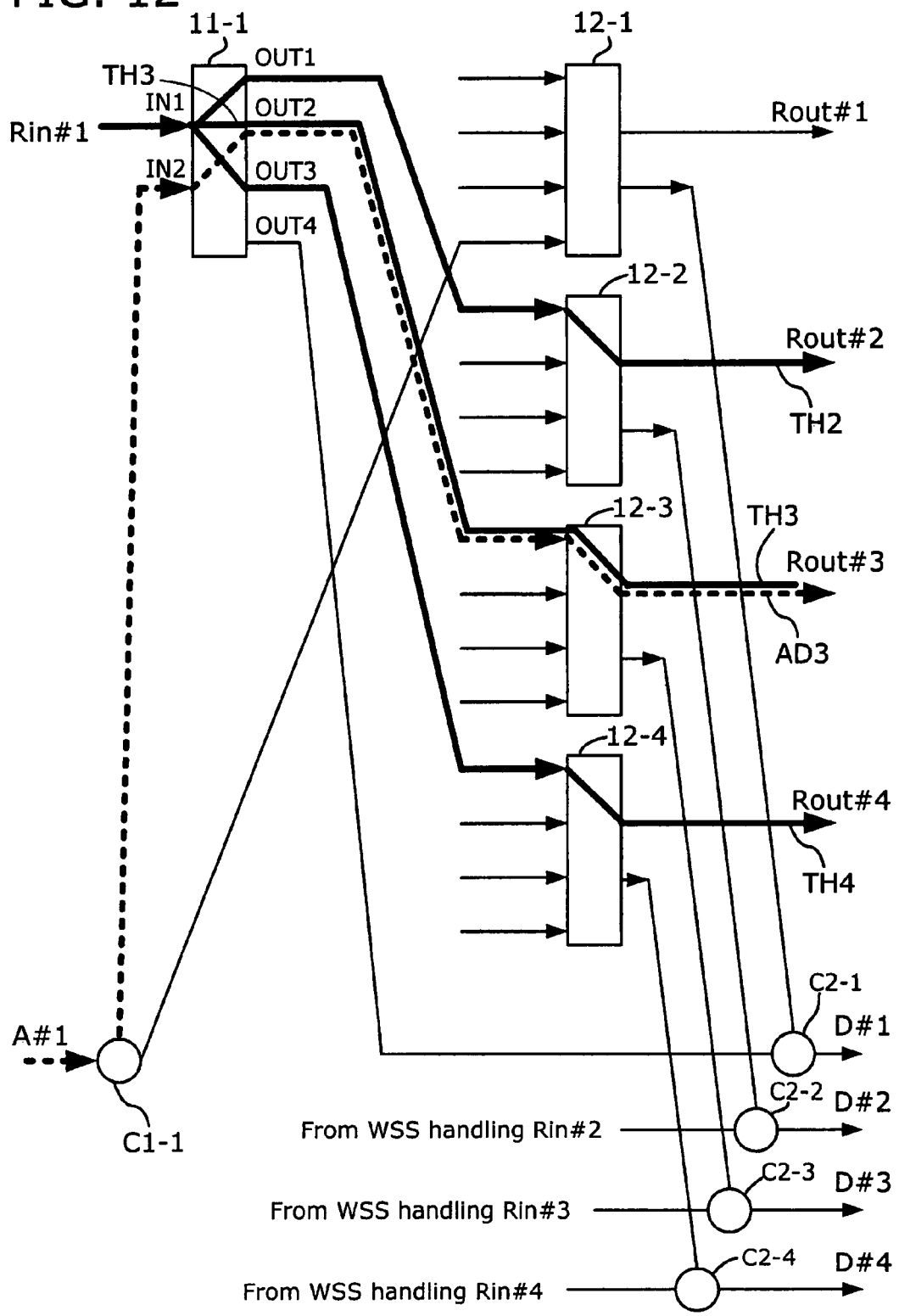

FIG. 12 shows yet another example of switching paths. The bold dotted line indicates an add path AD3 from add route A#1 to output route Rout#3. The bold solid lines represent the following three through paths: TH2 from input route Rin#1 to output route Rout#2; TH3 from input route Rin#1 to output route Rout#3; and TH4 from input route Rin#1 to output route Rout#4.

In the case shown in FIG. 12, the add path AD3 can work simultaneously with the through path TH2. However, the same add path AD3 cannot work simultaneously with the next through path TH3 because the two paths collide at output port OUT2 of the WSS 11-1. The add path AD3 is unable to work simultaneously with the through path TH4 either since these two paths are twisted within the WSS 11-1.

Figure 13:
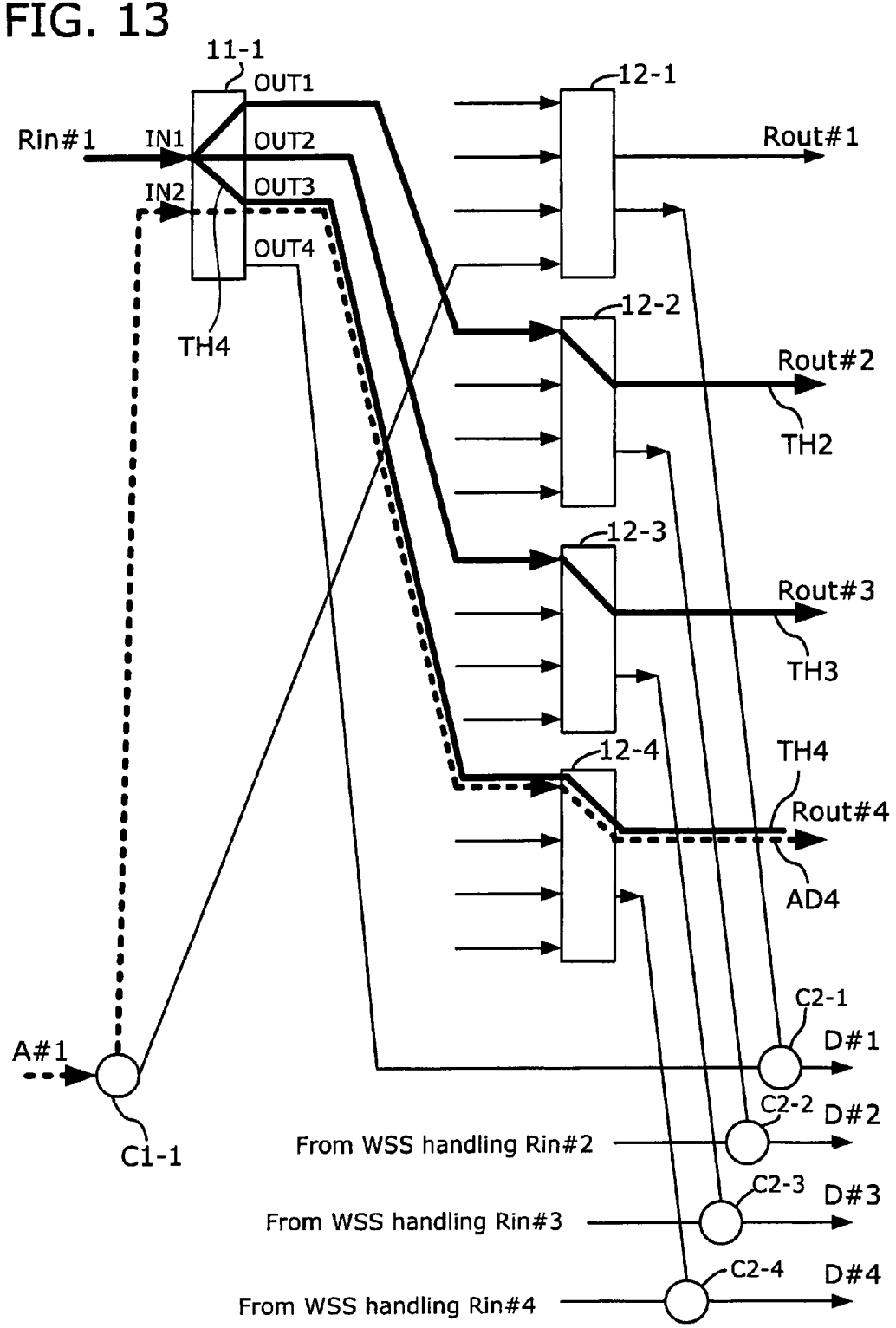

FIG. 13 shows still another example of switching paths. The bold dotted line indicates an add path AD4 from add route A#1 to output route Rout#4. The bold solid lines represent the following three through paths: TH2 from input route Rin#1 to output route Rout#2; TH3 from input route Rin#1 to output route Rout#3; and TH4 from input route Rin#1 to output route Rout#4.

In the case shown in FIG. 13, the add path AD4 cannot work simultaneously with the through path TH2 since, at the WSS 11-1, their output ports OUT1 and OUT3 are not immediately adjacent to each other (see FIG. 4). On the other hand, the add path AD4 can work simultaneously with the next through path TH3. The add path AD4 cannot work simultaneously with the through path TH4 since the two paths collide at output port OUT3 of the WSS 11-1.

Switching Between Input Route and Drop Route (1)

Figure 14:
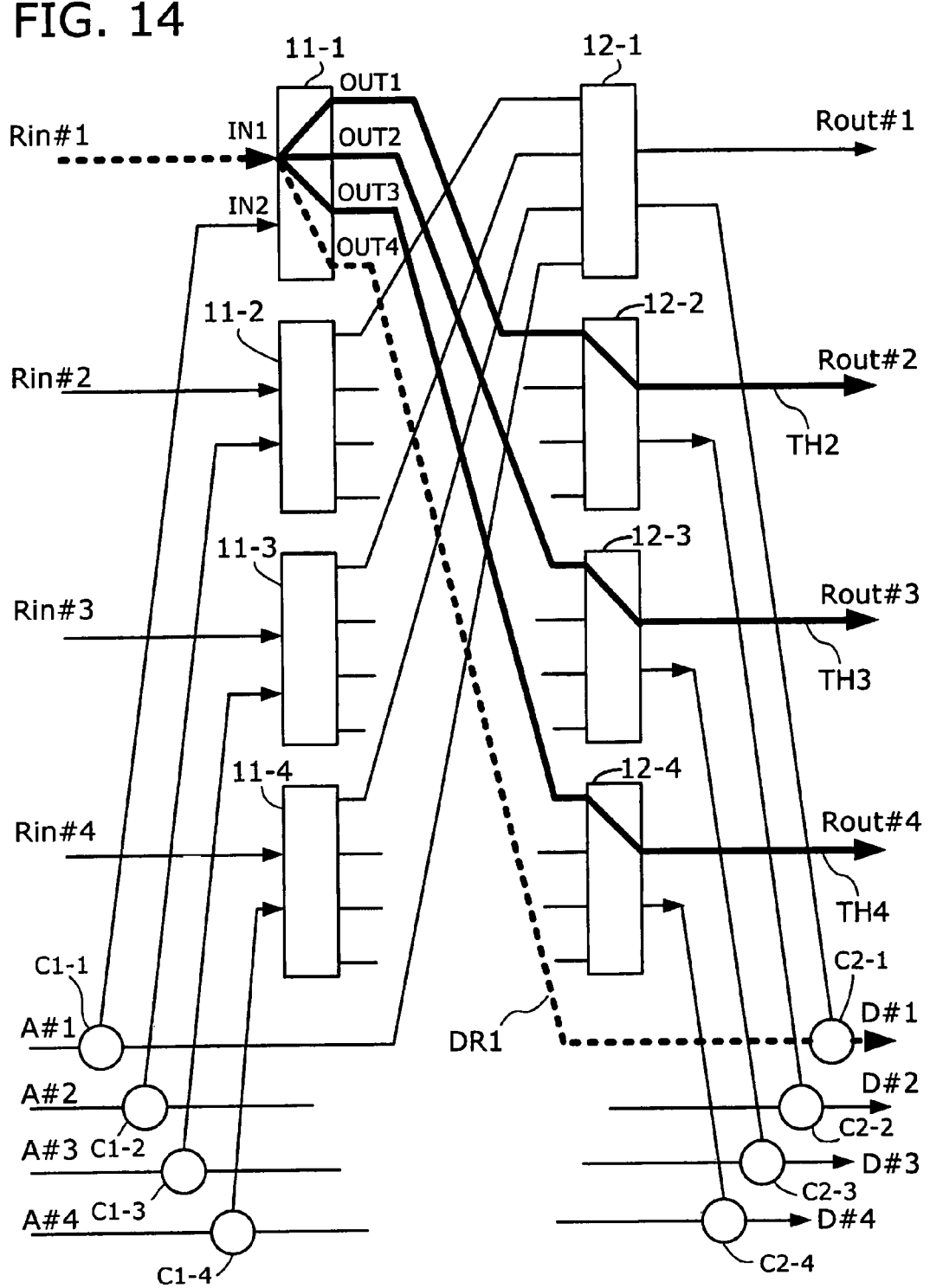

Referring now to FIGS. 14 to 17, this section will describe how the optical cross-connect 1a switches optical signals of, for example, input route Rin#1 and drop route D#1. FIG. 14 shows several switching paths that the optical cross-connect 1a can produce. The bold dotted line indicates a drop path DR1 from input route Rin#1 to drop route D#1. The bold solid lines represent the following three through paths: TH2 from input route Rin#1 to output route Rout#2; TH3 from input route Rin#1 to output route Rout#3; and TH4 from input route Rin#1 to output route Rout#4.

In the case shown in FIG. 14, the drop path DR1 cannot work simultaneously with the through path TH2. This is because the WSS 11-1 is inherently unable to bring an optical signal from input port IN1 to two output ports OUT1 and OUT4 at the same time (see FIG. 8). For the same reason, the drop path DR1 cannot work simultaneously with the other through paths TH3 and TH4.

Figure 15:
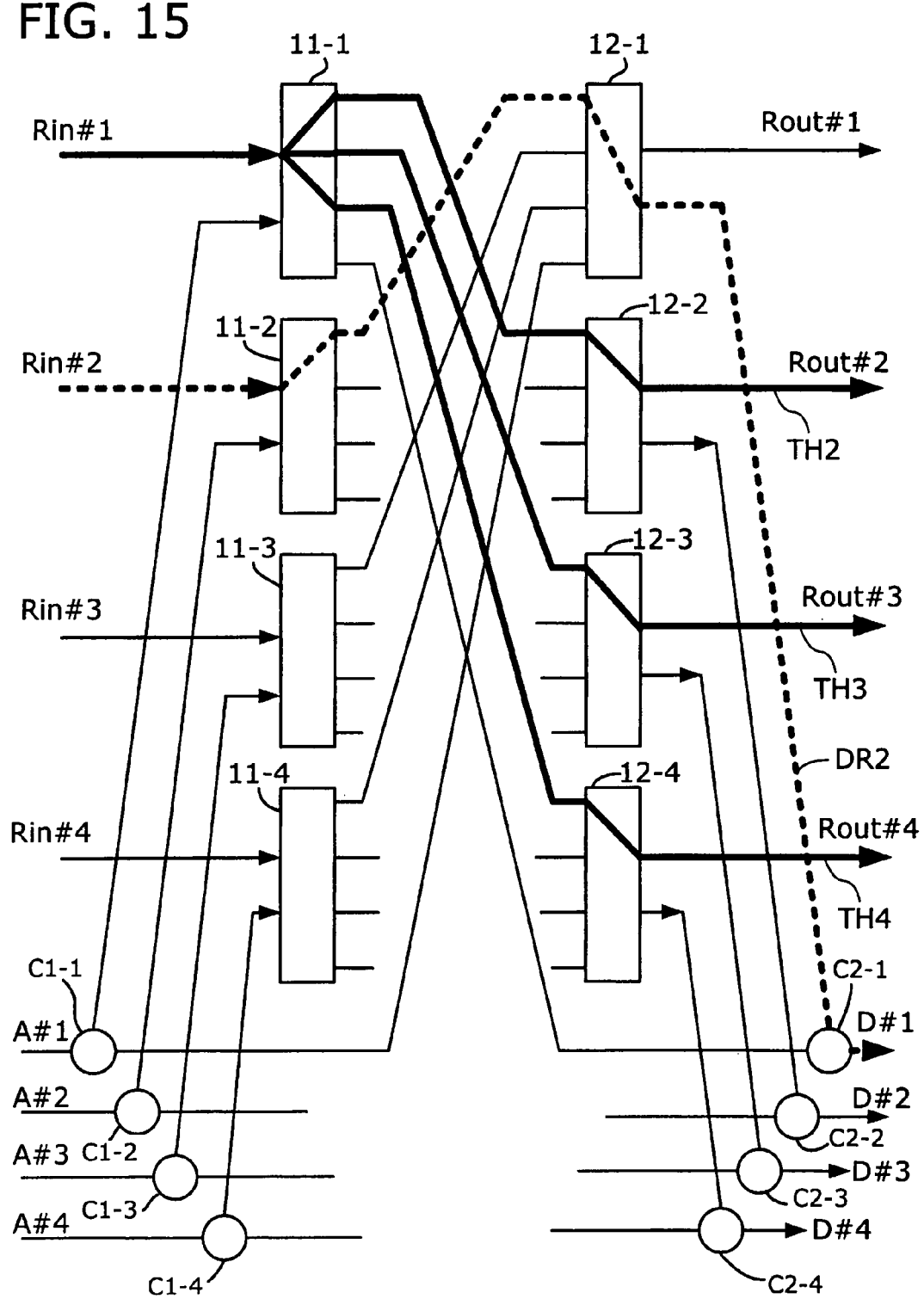

FIG. 15 shows another example of switching paths. The bold dotted line indicates a drop path DR2 from input route Rin#2 to drop route D#1. The bold solid lines represent the following three through paths: TH2 from input route Rin#1 to output route Rout#2; TH3 from input route Rin#1 to output route Rout#3; and TH4 from input route Rin#1 to output route Rout#4. In the case shown in FIG. 15, the drop path DR2 can work simultaneously with any one of the three through paths TH2, TH3, and TH4.

Figure 16:
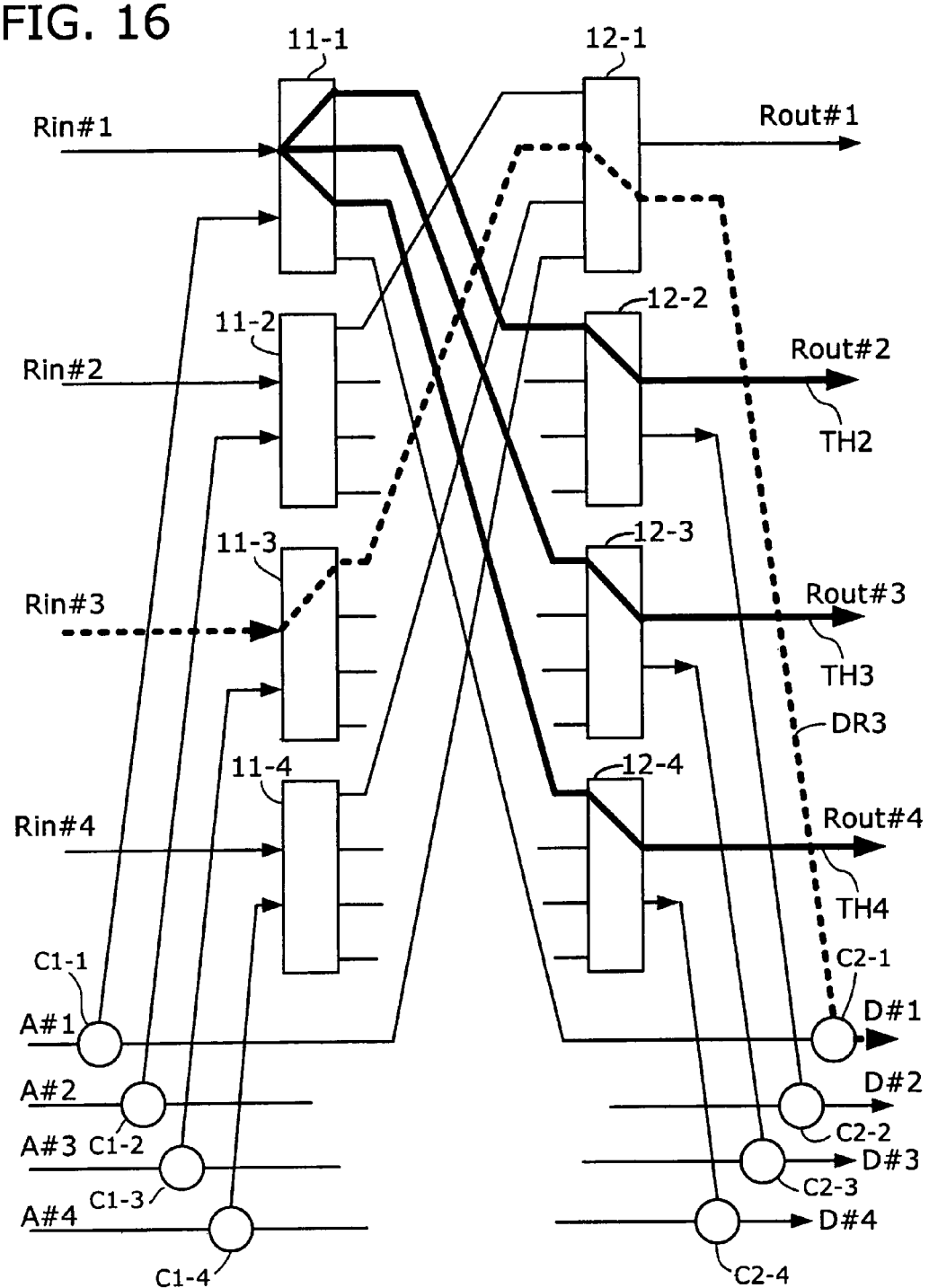

FIG. 16 shows yet another example of switching paths. The bold dotted line indicates a drop path DR3 from input route Rin#3 to drop route D#1. The bold solid lines represent the following three through paths: TH2 from input route Rin#1 to output route Rout#2; TH3 from input route Rin#1 to output route Rout#3; and TH4 from input route Rin#1 to output route Rout#4. In the case shown in FIG. 16, the drop path DR3 can work simultaneously with any one of the three through paths TH2, TH3, and TH4.

Figure 17:
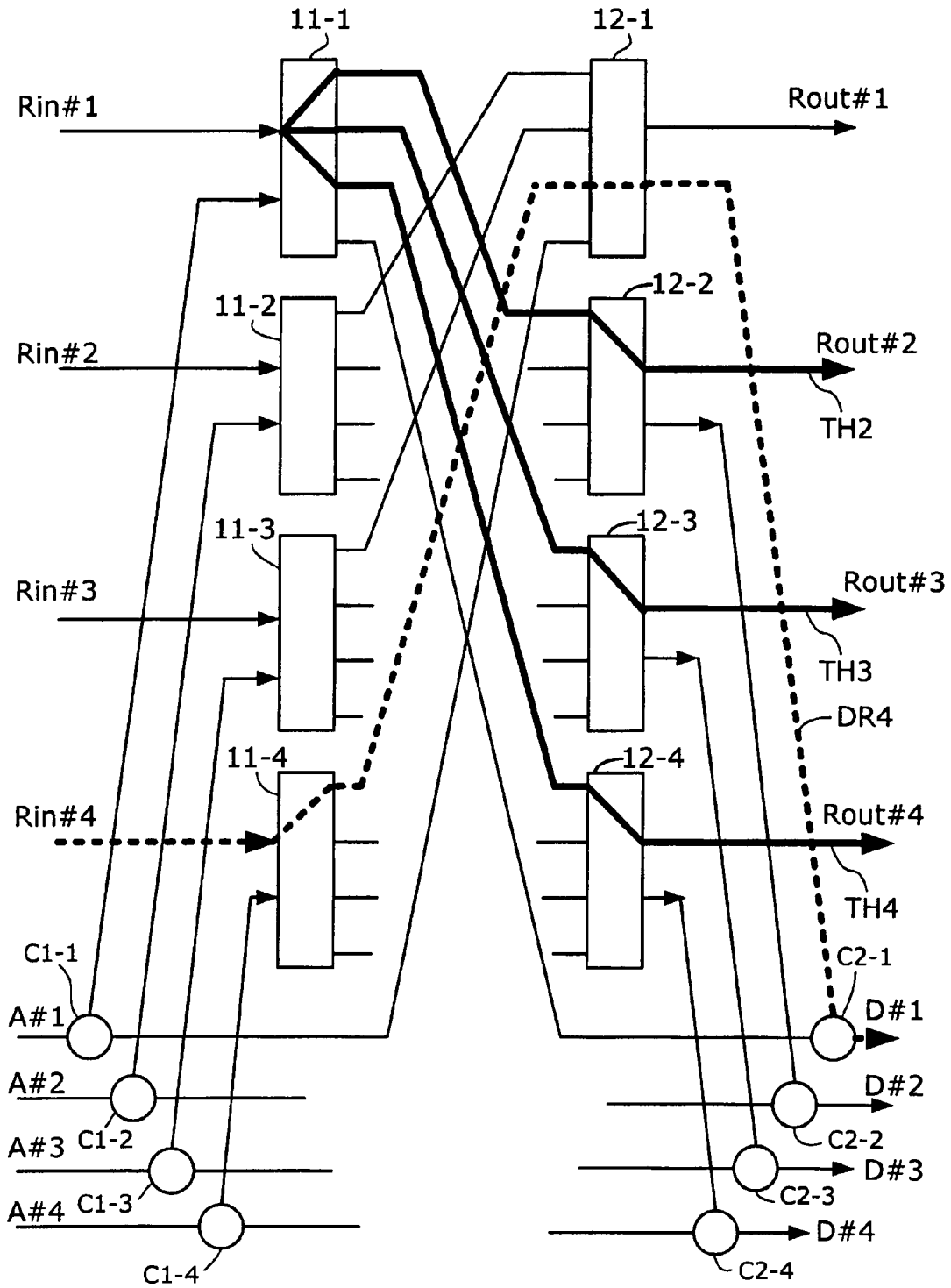

FIG. 17 shows still another example of switching paths. The bold dotted line indicates a drop path DR4 from input route Rin#4 to drop route D#1. The bold solid lines represent the following three through paths: TH2 from input route Rin#1 to output route Rout#2; TH3 from input route Rin#1 to output route Rout#3; and TH4 from input route Rin#1 to output route Rout#4. In the case shown in FIG. 17, the drop path DR4 can work simultaneously with any one of the three through paths TH2, TH3, and TH4.

Cross-Connection Feasibility Table (1)

Figure 19:
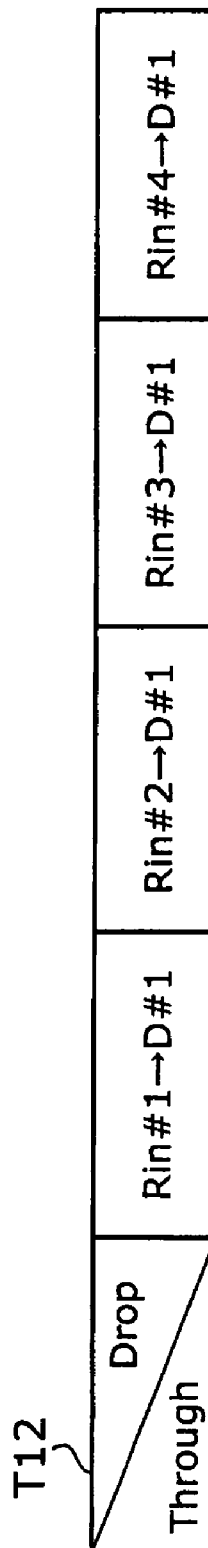

This section describes tables that represent simultaneous feasibility of optical cross-connections. FIGS. 18 and 19 show examples of such tables T11 and T12, respectively. Specifically, table T11 summarizes simultaneous feasibility of cross-connections between input route Rin#1 and add route A#1, which has been discussed in an earlier section with reference to FIGS. 10 to 13. Table T12, on the other hand, summarizes simultaneous feasibility of cross-connections between input route Rin#1 and drop route D#1, which has been discussed in the preceding section with reference to FIGS. 14 to 17.

The table entries having a value of "YES" indicate that the corresponding combination of switching paths can work simultaneously with each other. The top-left entry of table T11, for example, is marked "YES," meaning that an add switching path from add route A#1 to output route Rout#1 can work together with a through switching path from input route Rin#1 to output route Rout#2.

Table entries having a value of "NO" indicate that the corresponding combination of switching paths cannot work simultaneously (in other words, one of those paths can work selectively). The letter in parentheses gives the reason for that non-simultaneity. Specifically, "NO (a)" means that two switching paths collide at an output port of WSS. "NO (b)" means that two switching paths are twisted within a WSS. "NO (c)" means that two output ports are not immediately adjacent. "NO (d)" means that one input signal is directed to multiple output ports. See the entry at column 2, row 1 of table T11, for example. This entry has a value of "NO (a)," indicating that the add switching path from add route A#1 to output route Rout#2 cannot work together with a through switching path from input route Rin#1 to output route Rout#2 because these two paths collide at an output port of a WSS.

Figure 20:
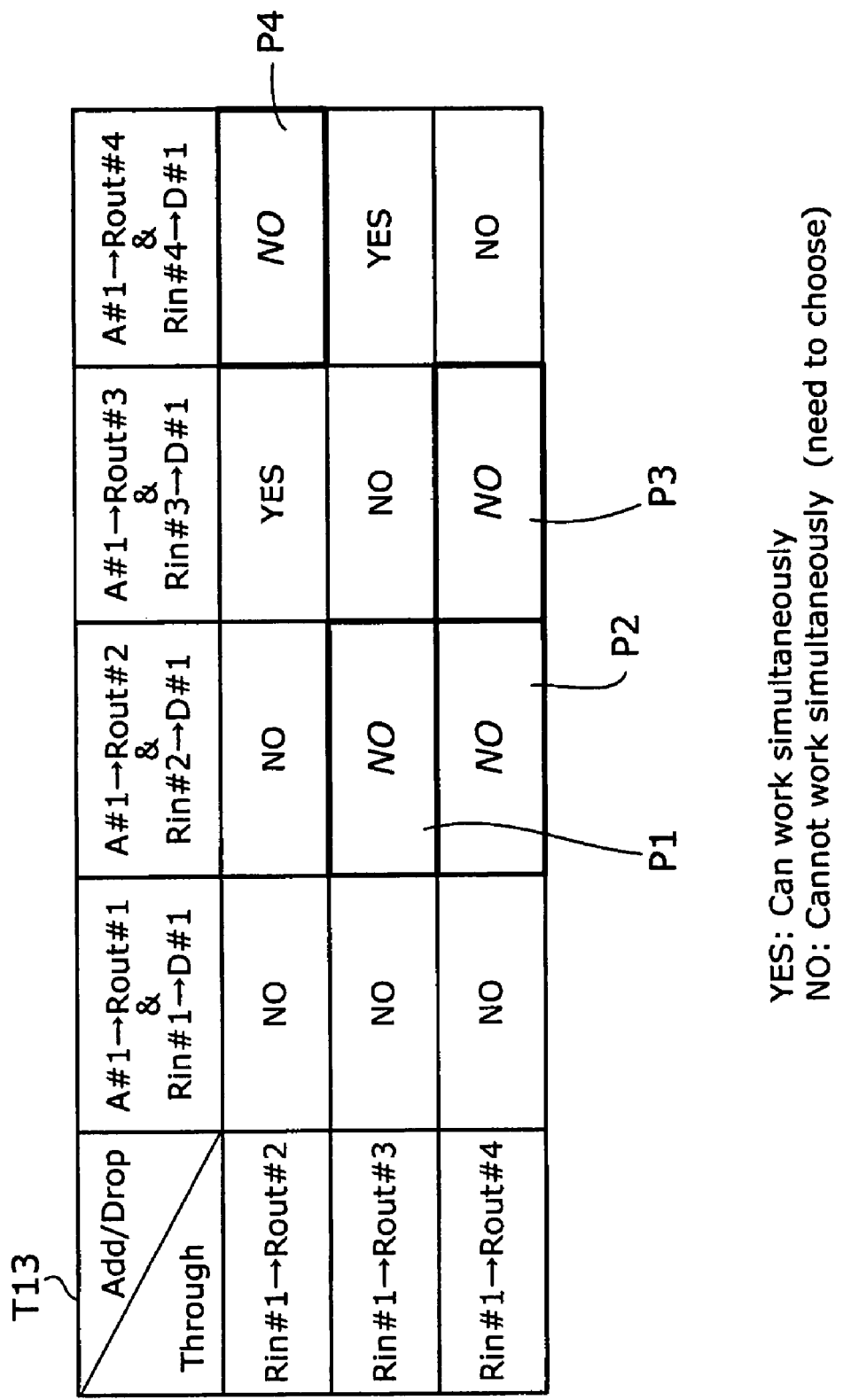

FIG. 20 shows yet another table representing simultaneous feasibility of optical cross-connections. This table T13 is a logical product of table T11 and table T12, which is created by performing a logical operation on each corresponding pair of entries of those two tables. Specifically, let x and y represent respective values of table T11 and table T12 at a particular column and row. The logical product of two table entries (x, y) takes a value of "YES" if (x,y)=(YES,YES) or a value of "NO" if (x,y)=(YES,NO) or (NO,YES) or (NO,NO). The resulting value is then set to a corresponding entry of table T13.

In table T13, the entries having a value of "YES" indicate that the corresponding through switching path and add/drop switching paths can work simultaneously. See the entry at column 3, row 1, for example. This entry has a value of "YES," meaning that a through switching path from input route Rin#1 to output route Rout#2, an add switching path from add route A#1 to output route Rout#3, and a drop switching path from input route Rin#3 to drop route D#1 can all work at the same time.

The other entries of table T13 have a value of "NO" to indicate that either the corresponding through switching path or the corresponding add/drop switching paths can work selectively. See the top-left entry of table T13, for example. This table entry indicates that the optical cross-connect 1a does not allow the simultaneous use of a through switching path from input route Rin#1 to output route Rout#2, an add switching path from add route A#1 to output route Rout#1, and a drop switching path from input route Rin#1 to drop route D#1. Reversely stated, the table entry suggests that either the through switching path alone or the add/drop switching paths can be implemented.

In reality, it may not be necessary to make available every combination of a through path and add/drop paths for simultaneous use. Rather, most cases require either the former or the latter alone. Under this assumption, table T13 is more optimal, or less redundant, than table T63 discussed earlier in FIG. 39 since table T13 contains a smaller number of entries marked "YES" than table T63. The present embodiment reduces the number of simultaneously workable switching patterns.

Figure 35:
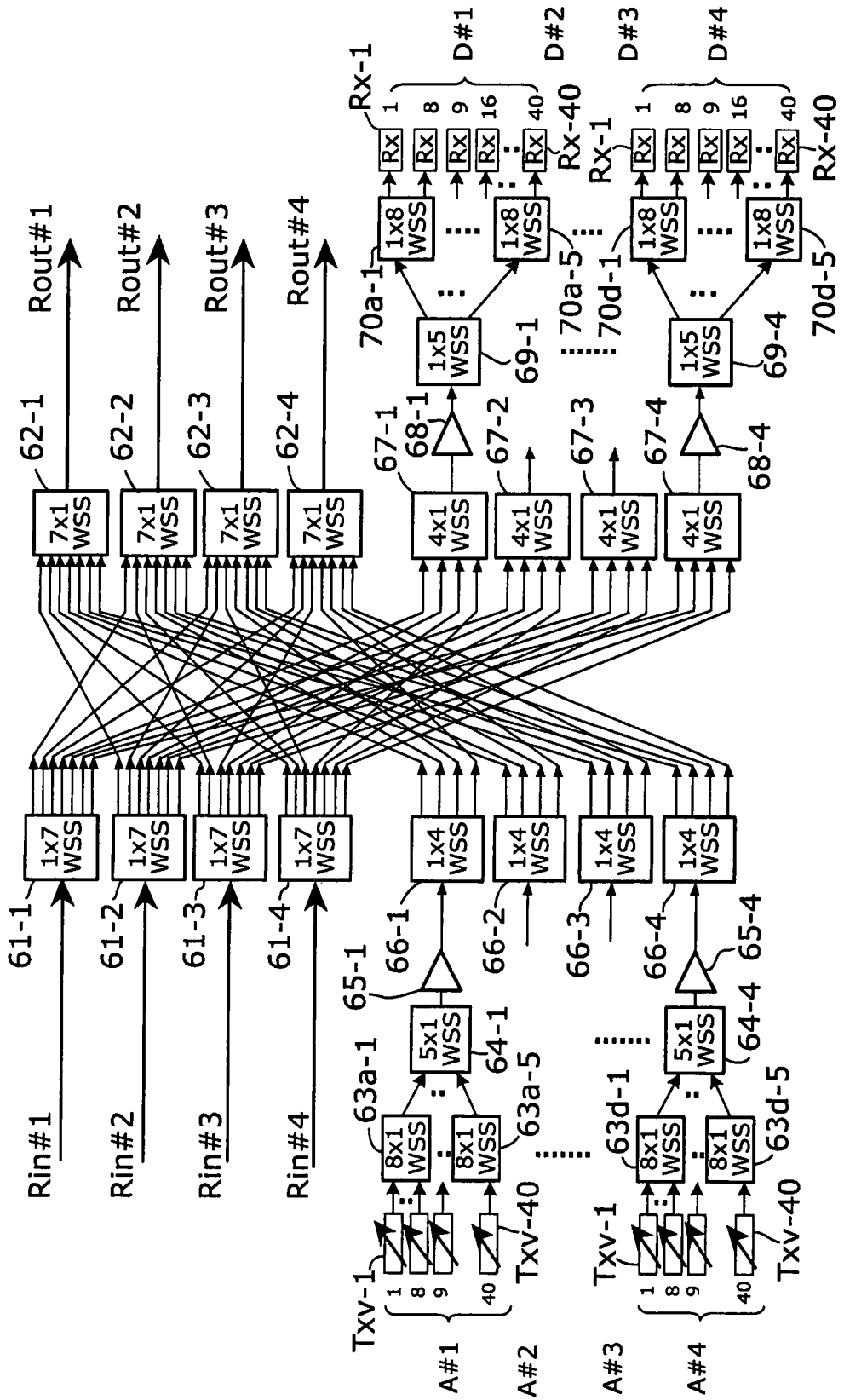
FIG. 35 shows a structure of another conventional optical cross-connect.
Figure 36:
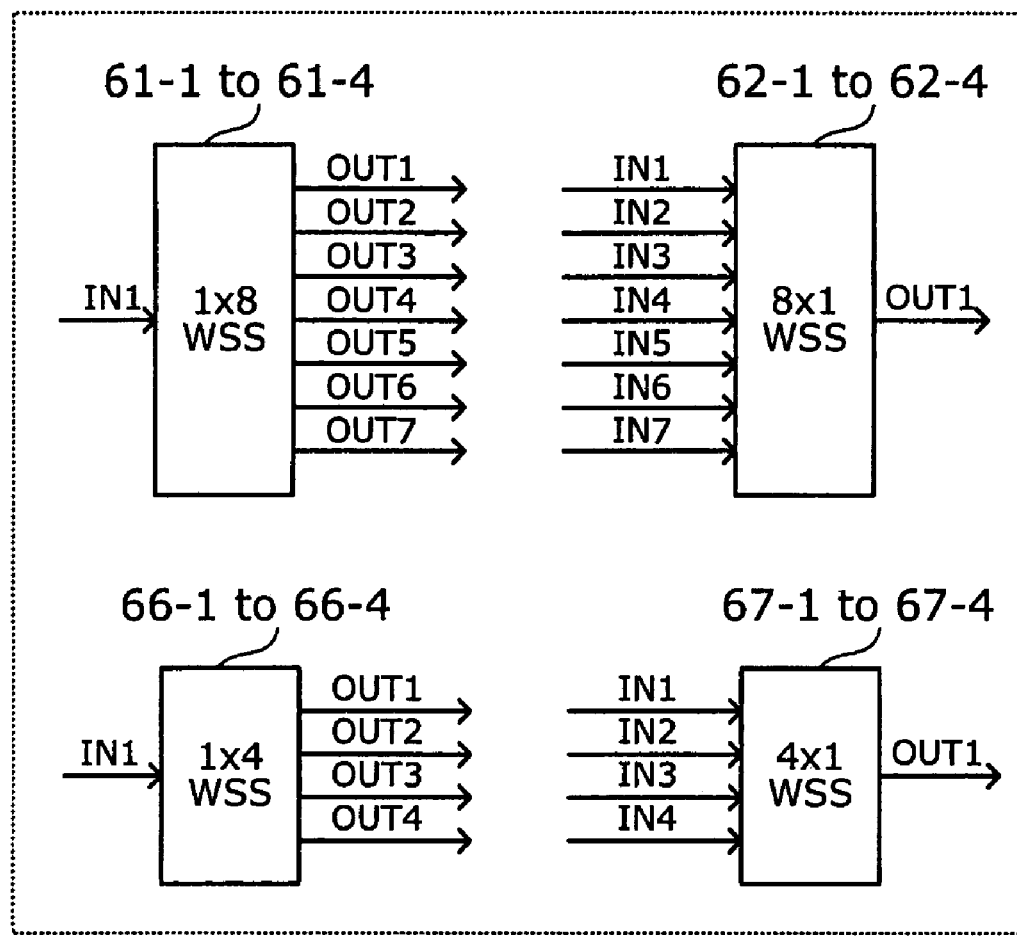
FIG. 36 shows four types of WSSs and their input and output port numbers as a legend for WSSs shown in FIG. 35.

More specifically, compare the switching patterns P1 to P4 shown in table T13 of FIG. 20 with the corresponding entries of table T63 of FIG. 39. The conventional optical cross-connect 60 (FIG. 35) allows the simultaneous use of those switching patterns P1 to P4. In contrast, the optical cross-connect 1a according to the present embodiment removes the simultaneity of such patterns P1 to P4. In the case of pattern P1, the optical cross-connect 1a requires to choose either a through switching path from Rin#1 to Rout#3 or add/drop switching paths from A#1 to Rout#2 and from Rin#2 to D#1. In the case of pattern P2, it requires to choose a through switching path from Rin#1 to Rout#4 or add/drop switching paths from A#1 to Rout#2 and from Rin#2 to D#1. Further, in the case of pattern P3, it requires to choose a through switching path from Rin#1 to Rout#4 or add/drop switching paths from A#1 to Rout#3 and from Rin#3 to D#1. In the case of pattern P4, it requires to choose a through switching path from Rin#1 to Rout#2 or add/drop switching paths from A#1 to Rout#4 and from Rin#4 to D#1.

In summary of this section, the proposed optical cross-connect 1a eliminates many of the unnecessary combinations of through switching paths and add/drop switching paths, thus optimizing the number of WSSs used and interconnections between them. The present invention thus contributes to the realization of an optimally-sized optical cross-connect.

Optical Cross-Connect (2)

Figure 21:
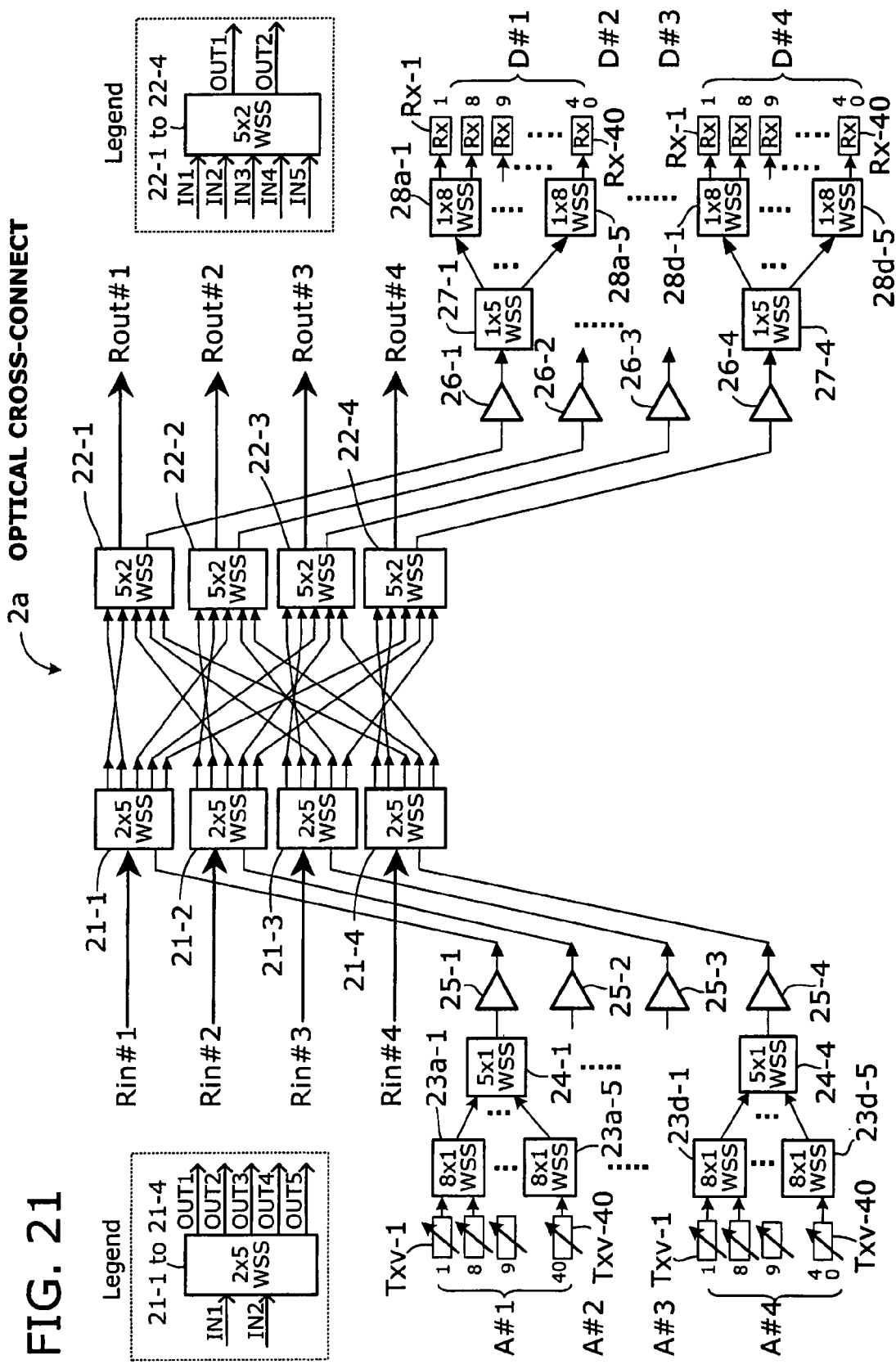
FIG. 21 shows a variant of the foregoing optical cross-connect according to the present invention.

This section describes a modified version of the foregoing optical cross-connect 1a according to the present invention. FIG. 21 shows an optical cross-connect 2a designed to perform switching between N routes each having 40 WDM channels (N=4 in this example). This optical cross-connect 2a has a 2×(N+1) WSS for each input route and an (N+1)×2 WSS for each output route. Here, the prefix "2×(N+1)" stands for two inputs and (N+1) outputs, and "(N+1)×2" stands for (N+1) inputs and two outputs. More specifically, four 2×5 WSSs 21-1 to 21-4 are coupled to input routes Rin#1 to Rin#4, and four 5×2 WSSs 22-1 to 22-4 are coupled to output routes Rout#1 to Rout#4.

The 2×5 WSSs 21-1 to 21-4 are connected to the 5×2 WSSs 22-1 to 22-4 in the following way: Output port OUT1 (first output port) of the first 2×5 WSS 21-1 is connected to input port IN2 (second input port) of the first 5×2 WSS 22-1. Output port OUT2 (second output port) of the WSS 21-1 is connected to input port IN1 (first input port) of the first 5×2 WSS 22-1. Output port OUT3 of the WSS 21-1 is connected to input port IN3 of the second 5×2 WSS 22-2. Output port OUT4 of the WSS 21-1 is connected to input port IN3 of the third 5×2 WSS 22-3. Output port OUT5 of the WSS 21-1 is connected to input port IN3 of the fourth 5×2 WSS 22-4.

Output port OUT1 of the second 2×5 WSS 21-2 is connected to input port IN2 of the 5×2 WSS 22-2. Output port OUT2 of the WSS 21-2 is connected to input port IN1 of the second 5×2 WSS 22-2. Output port OUT3 of the WSS 21-2 is connected to input port IN3 of the first 5×2 WSS 22-1. Output port OUT4 of the WSS 21-2 is connected to input port IN4 of the third 5×2 WSS 22-3. Output port OUT5 of the WSS 21-2 is connected to input port IN4 of the fourth 5×2 WSS 22-4.

Output port OUT1 of the third 2×5 WSS 21-3 is connected to input port IN2 of the third 5×2 WSS 22-3. Output port OUT2 of the WSS 21-3 is connected to input port IN1 of the third 5×2 WSS 22-3. Output port OUT3 of the WSS 21-3 is connected to input port IN4 of the first 5×2 WSS 22-1. Output port OUT4 of the WSS 21-3 is connected to input port IN4 of the second 5×2 WSS 22-2. Output port OUT5 of the WSS 21-3 is connected to input port IN5 of the fourth 5×2 WSS 22-4.

Output port OUT1 of the fourth 2×5 WSS 21-4 is connected to input port IN2 of the fourth 5×2 WSS 22-4. Output port OUT2 of the WSS 21-4 is connected to input port IN1 of the fourth 5×2 WSS 22-4. Output port OUT3 of the WSS 21-4 is connected to input port IN5 of the first 5×2 WSS 22-1. Output port OUT4 of the WSS 21-4 is connected to input port IN5 of the second 5×2 WSS 22-2. Output port OUT5 of the WSS 21-4 is connected to input port IN5 of the third 5×2 WSS 22-3.

In the add section shown in the lower-left quarter of FIG. 21, the optical cross-connect 2a has the following elements to select an add signal on the first add route A#1: forty wavelength-tunable transmitters Txv-1 to Txv-40, five 8×1 WSSs 23a-1 to 23a-5, a 5×1 WSS 24-1, and an optical amplifier (WDM amplifier) 25-1. The forty transmitters Txv-1 to Txv-40 transmit forty optical signals, respectively. Each 8×1 WSS 23a-1 to 23a-5 receives eight out of forty optical signals from the transmitters Txv-1 to Txv-40 and outputs one selected optical signal to the subsequent 5×1 WSS 24-1. The 5×1 WSS 24-1 then chooses one optical signal out of five optical signals received from the 8×1 WSS 23a-1 to 23a-5. The optical amplifier 25-1 amplifies the output of this WSS 24-1 when sending it as an add signal to the first 2×5 WSS 21-1. Other three add routes A#2 to A#4 have the same hardware structure as the first add route A#1 described above.

The first optical amplifier 25-1 for add route A#1 sends its output signal (i.e., selected add signal) to input port IN2 of the first 2×5 WSS 21-1. Likewise, the second optical amplifier 25-2 for add route A#2 sends its output signal to input port IN2 of the second 2×5 WSS 21-2. The third optical amplifier 25-3 for add route A#3 sends its output signal to input port IN2 of the third 2×5 WSS 21-3. The fourth optical amplifier 25-4 for add route A#4 sends its output signal to input port IN2 of the fourth 2×5 WSS 21-4.

In the drop section shown in the lower-right quarter of FIG. 21, four optical amplifiers (WDM amplifiers) 26-1 to 26-4 serve as the front end for switched drop signals. Specifically, the first optical amplifier 26-1 receives a signal for drop route D#1 from output port OUT2 of the first 5×2 WSS 22-1. Likewise, the second optical amplifier 26-2 receives a signal for drop route D#2 from output port OUT2 of the second 5×2 WSS 22-2. The third optical amplifier 26-3 receives a signal for drop route D#3 from output port OUT2 of the third 5×2 WSS 22-3. The fourth optical amplifier 26-4 receives a signal for drop route D#4 from output port OUT2 of the fourth 5×2 WSS 22-4.

In addition to the optical amplifier 26-1 mentioned above, the first drop route D#1 involves a 1×5 WSS 27-1, five 1×8 WSSs 28a-1 to 28a-5, and forty receivers Rx-1 to Rx-40. The optical amplifier 26-1 amplifies a drop signal received from the first 5×2 WSS 22-1. The 1×5 WSS 27-1 has five outputs connected respectively to five input ports of different 1×8 WSSs 28a-1 to 28a-5. With those 1×8 WSSs 28a-1 to 28a-5, the drop signal is directed to one of their forty output ports as specified. Specifically, eight outputs of the first 1×8 WSS 28a-1 are directed to a group of receivers Rx-1 to Rx-8, as are the outputs of the second 1×8 WSS 28a-2 to a subsequent group of receivers Rx-9 to Rx-16. Likewise, other three 1×8 WSSs 28a-3 to 28a-5 provide their outputs to corresponding receiver groups Rx-17 to Rx-24, Rx-25 to Rx-32, and Rx-33 to Rx-40. Each receiver Rx-1 to Rx-40 receives an optical drop signal (if supplied). Other three drop routes D#2 to D#4 have the same hardware structure as the first drop route D#1 described above.

Switching Between Input Route and Add Route (2)

Figure 22:
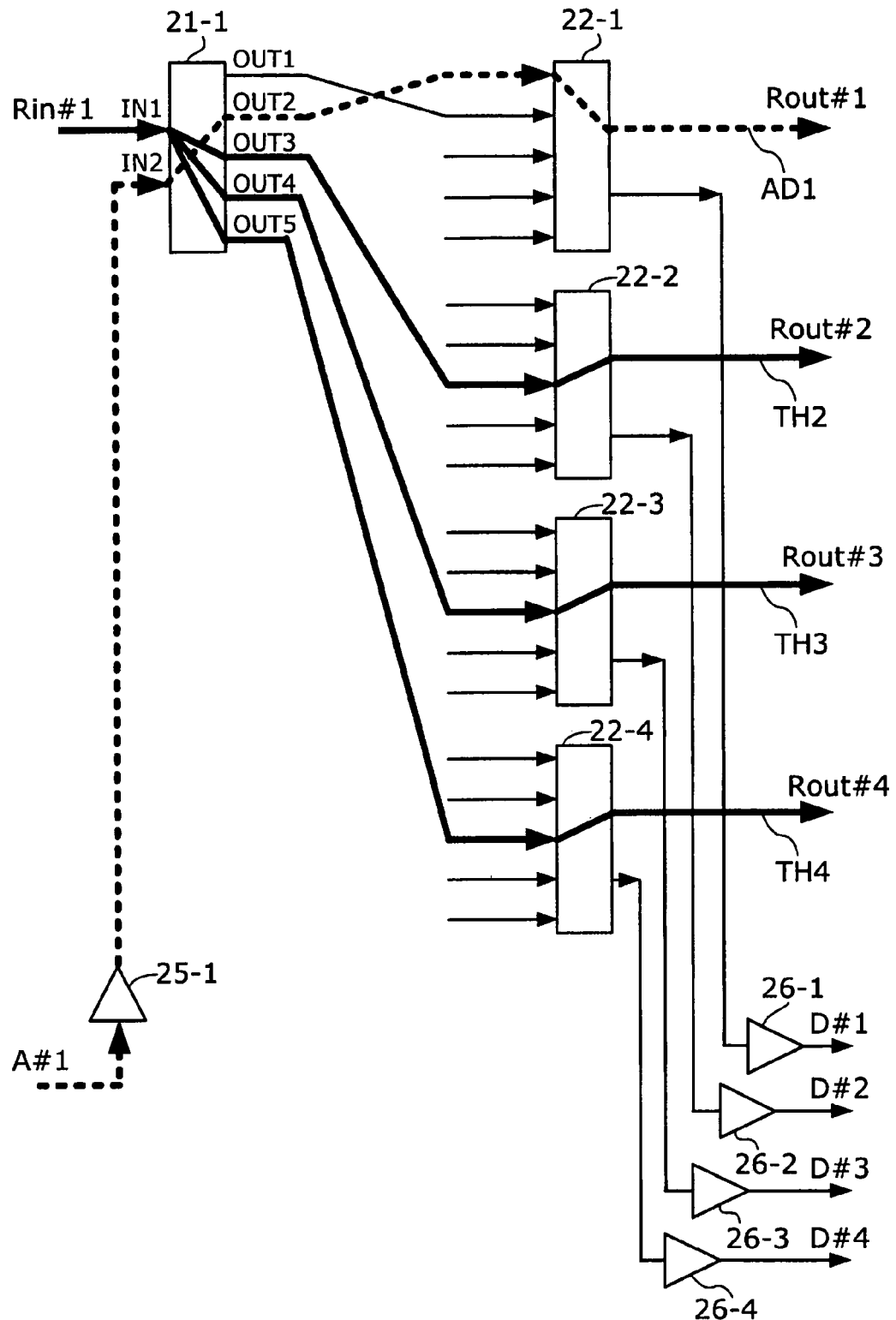
FIGS. 22 to 29 show various switching paths that an optical cross-connect can produce.

Referring now to FIGS. 22 to 25, this section will describe how the optical cross-connect 2a switches optical signals of, for example, input route Rin#1 and add route A#1. FIG. 22 shows an example of switching paths that the optical cross-connect 2a can produce. The bold dotted line indicates an add path AD1 from add route A#1 to output route Rout#1. The bold solid lines represent the following three through paths: TH2 from input route Rin#1 to output route Rout#2; TH3 from input route Rin#1 to output route Rout#3; and TH4 from input route Rin#1 to output route Rout#4.

In the case shown in FIG. 22, the add path AD1 cannot work simultaneously with the through path TH2 since these two paths are twisted in the 2×5 WSS 21-1. For the same reason, the add path AD1 cannot work simultaneously with the other two through paths TH3 and TH4.

Figure 23:
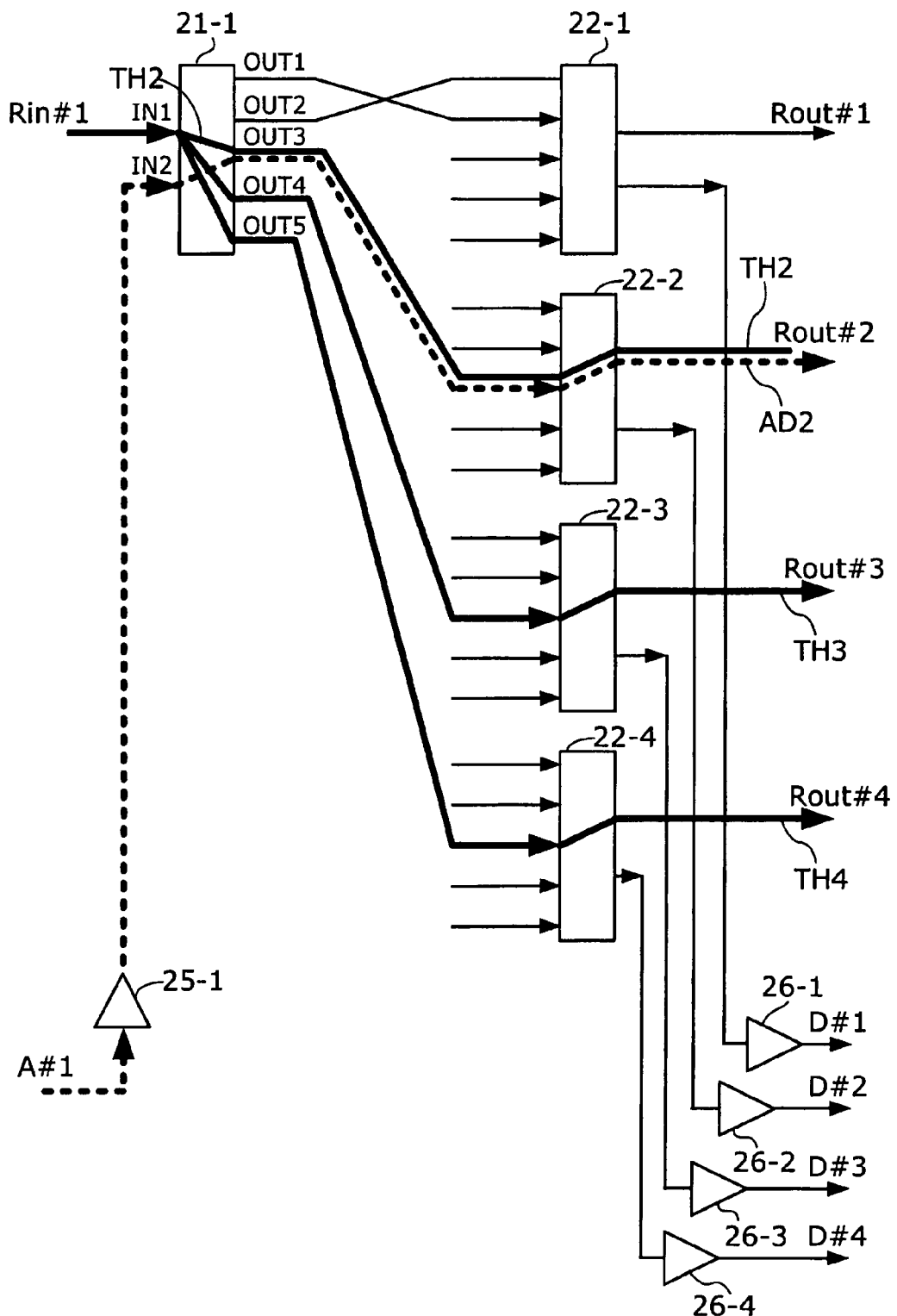

FIG. 23 shows another example of switching paths. The bold dotted line indicates an add path AD2 from add route A#1 to output route Rout#2. The bold solid lines represent the following three through paths: TH2 from input route Rin#1 to output route Rout#2; TH3 from input route Rin#1 to output route Rout#3; and TH4 from input route Rin#1 to output route Rout#4.

In the case shown in FIG. 23, the add path AD2 from add route A#1 to output route Rout#2 cannot work simultaneously with the through path TH2 since these two paths collide at output port OUT3 of the 2×5 WSS 21-1. The add path AD2 is unable to work simultaneously with the through path TH3 or TH4 since the paths are twisted within the 2×5 WSS 21-1.

Figure 24:
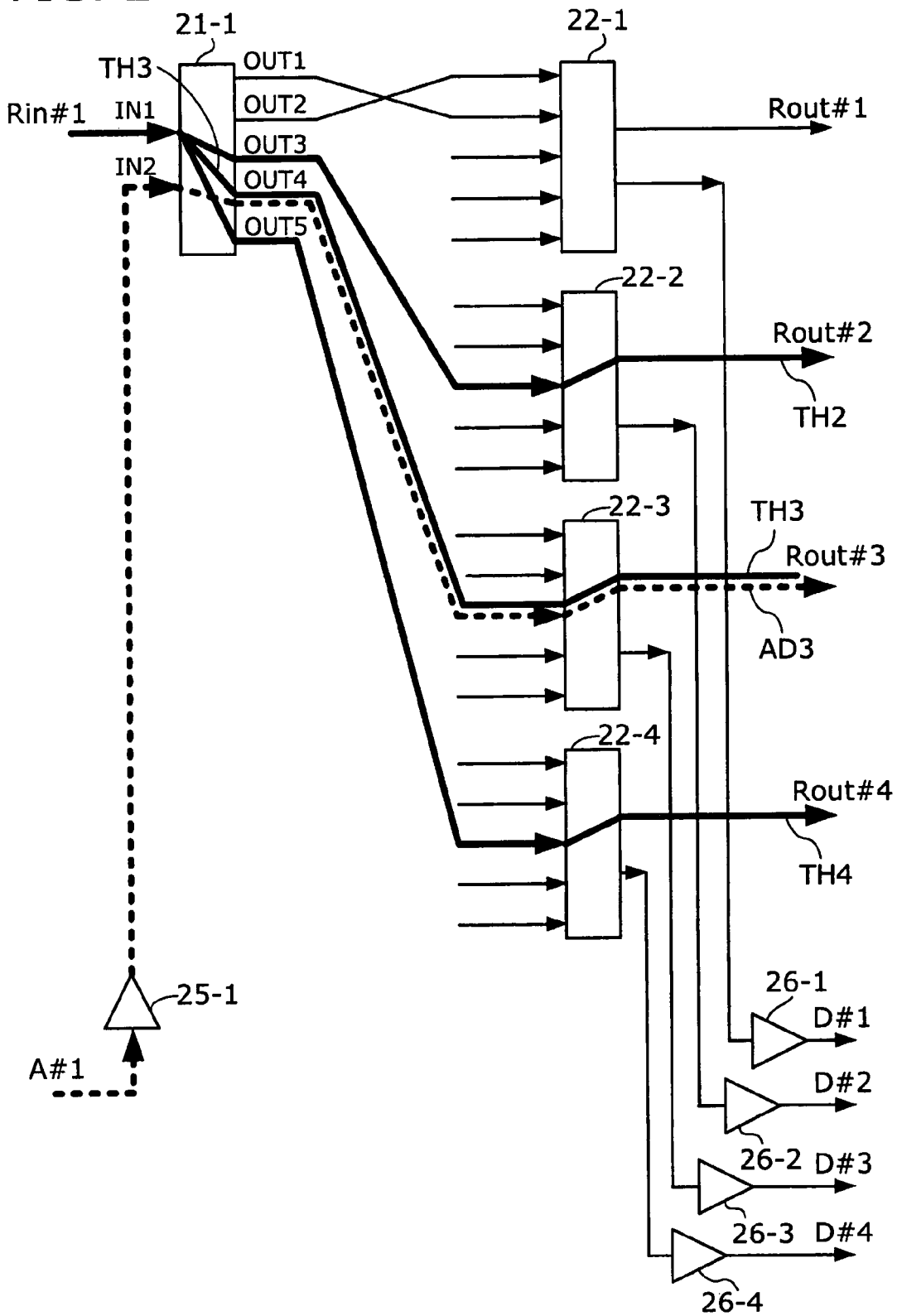

FIG. 24 shows yet another example of switching paths. The bold dotted line indicates an add path AD3 from add route A#1 to output route Rout#3. The bold solid lines represent the following three through paths: TH2 from input route Rin#1 to output route Rout#2; TH3 from input route Rin#1 to output route Rout#3; and TH4 from input route Rin#1 to output route Rout#4.

In the case shown in FIG. 24, the add path AD3 can work simultaneously with the through path TH2. The add path AD2, however, cannot work simultaneously with the through path TH3 since these two paths collide at output port OUT4 of the 2×5 WSS 21-1. The add path AD2 is also unable to work simultaneously with the other through path TH4 since these paths are twisted within the 2×5 WSS 21-1.

Figure 25:
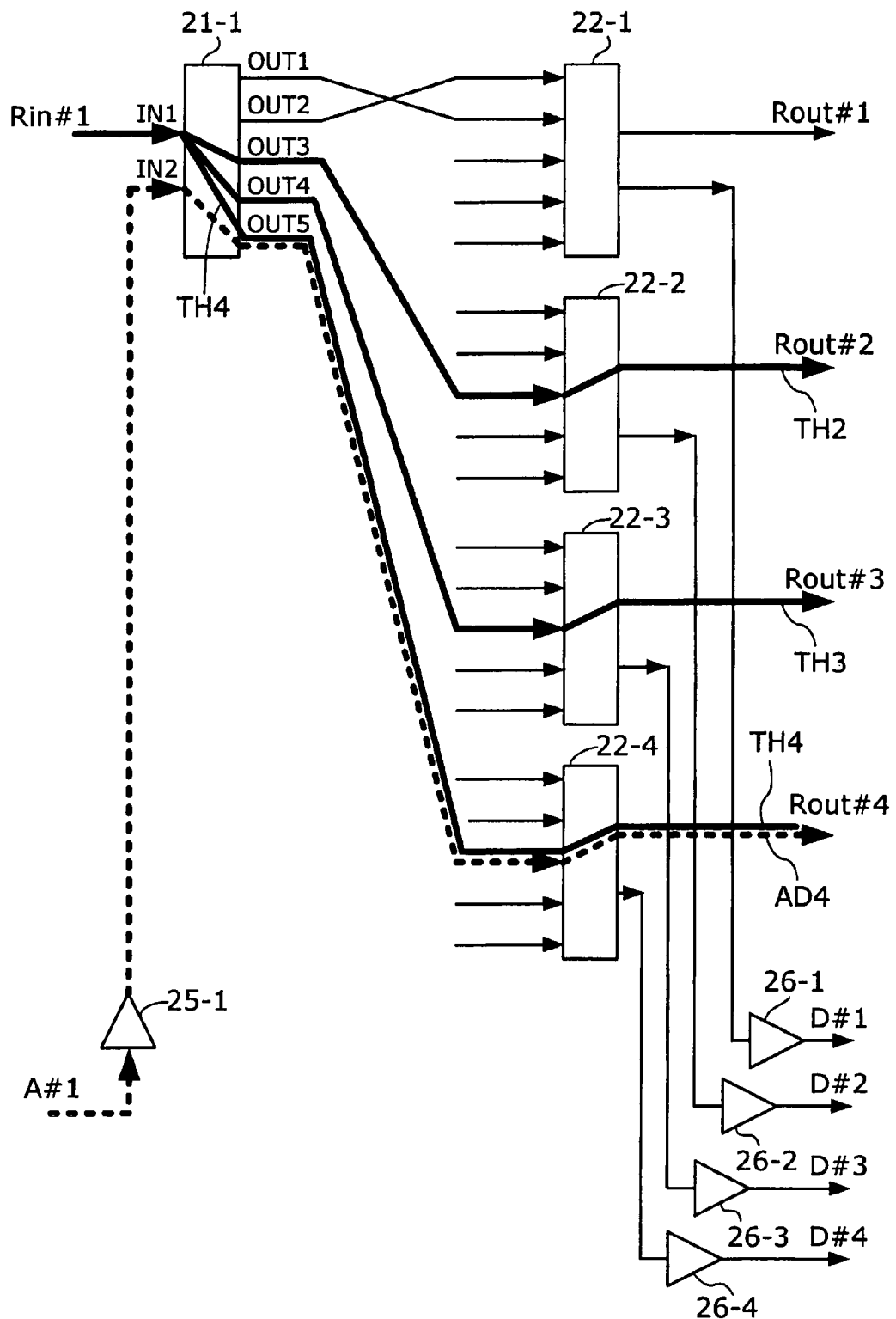

FIG. 25 shows still another example of switching paths. The bold dotted line indicates an add path AD4 from add route A#1 to output route Rout#4. The bold solid lines represent the following three through paths: TH2 from input route Rin#1 to output route Rout#2; TH3 from input route Rin#1 to output route Rout#3; and TH4 from input route Rin#1 to output route Rout#4.

In the case shown in FIG. 25, the add path AD4 cannot work simultaneously with the through path TH2 since, at the 2×5 WSS 21-1, their output ports OUT3 and OUT5 are not immediately adjacent to each other (see FIG. 4). The add path AD4, on the other hand, can work simultaneously with the through path TH3. The add path AD4 cannot work simultaneously with the through path TH4 since the two paths collide at output port OUT5 of the 2×5 WSS 21-1.

Switching Between Input Route and Drop Route (2)

Figure 26:
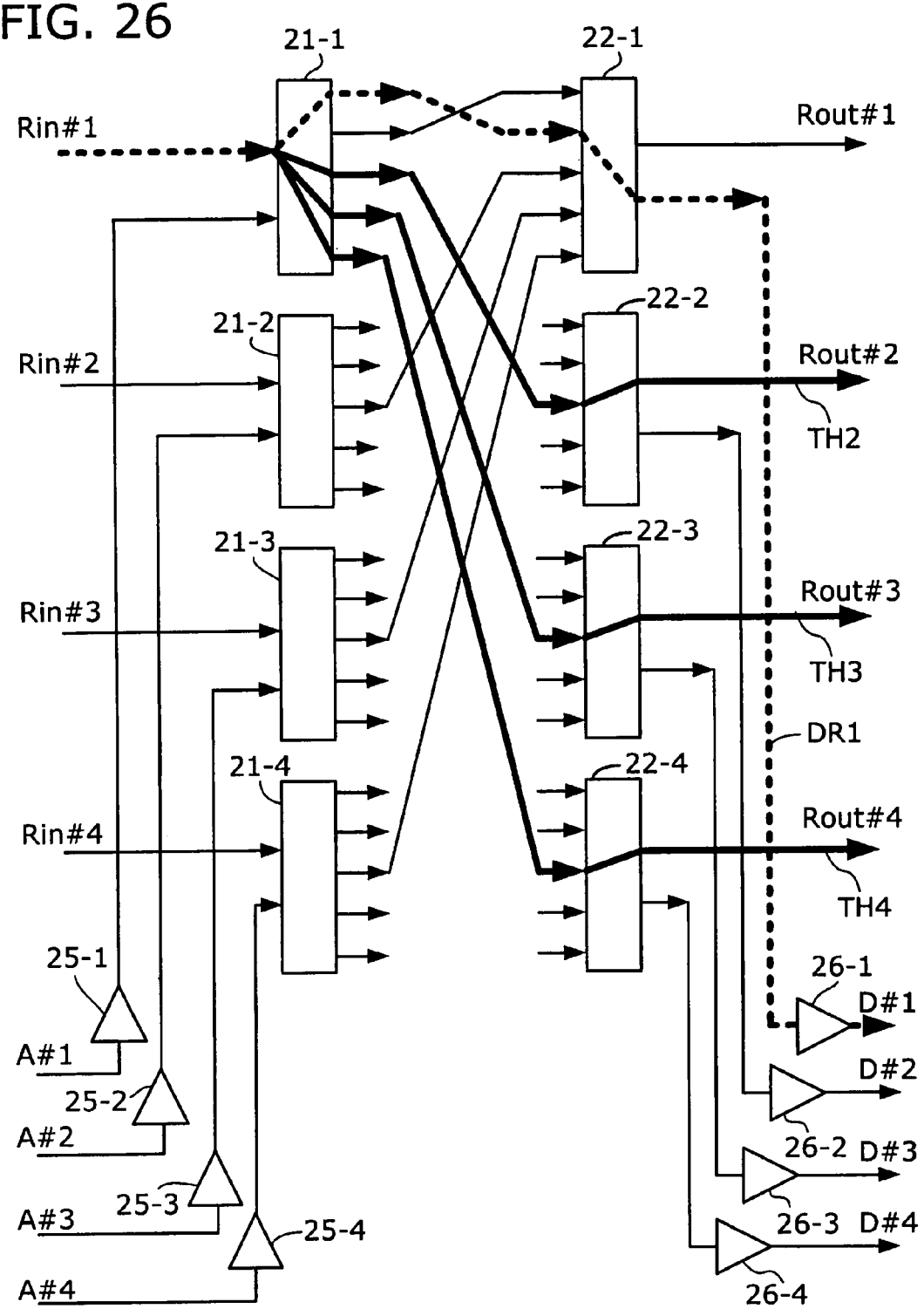

Referring now to FIGS. 26 to 29, this section describes how the optical cross-connect 2a switches optical signals of, for example, input route Rin#1 and drop route D#1. FIG. 26 shows an example of switching paths that the optical cross-connect 2a can produce. The bold dotted line indicates a drop path DR1 from input route Rin#1 to drop route D#1. The bold solid lines represent the following three through paths: TH2 from input route Rin#1 to output route Rout#2; TH3 from input route Rin#1 to output route Rout#3; and TH4 from input route Rin#1 to output route Rout#4.

In the case shown in FIG. 26, the drop path DR1 cannot work simultaneously with the through path TH2 since it is impossible for a WSS to route a single input signal to two output ports at the same time. For the same reason, the drop path DR1 cannot work simultaneously with the other through paths TH3 and TH4.

Figure 27:
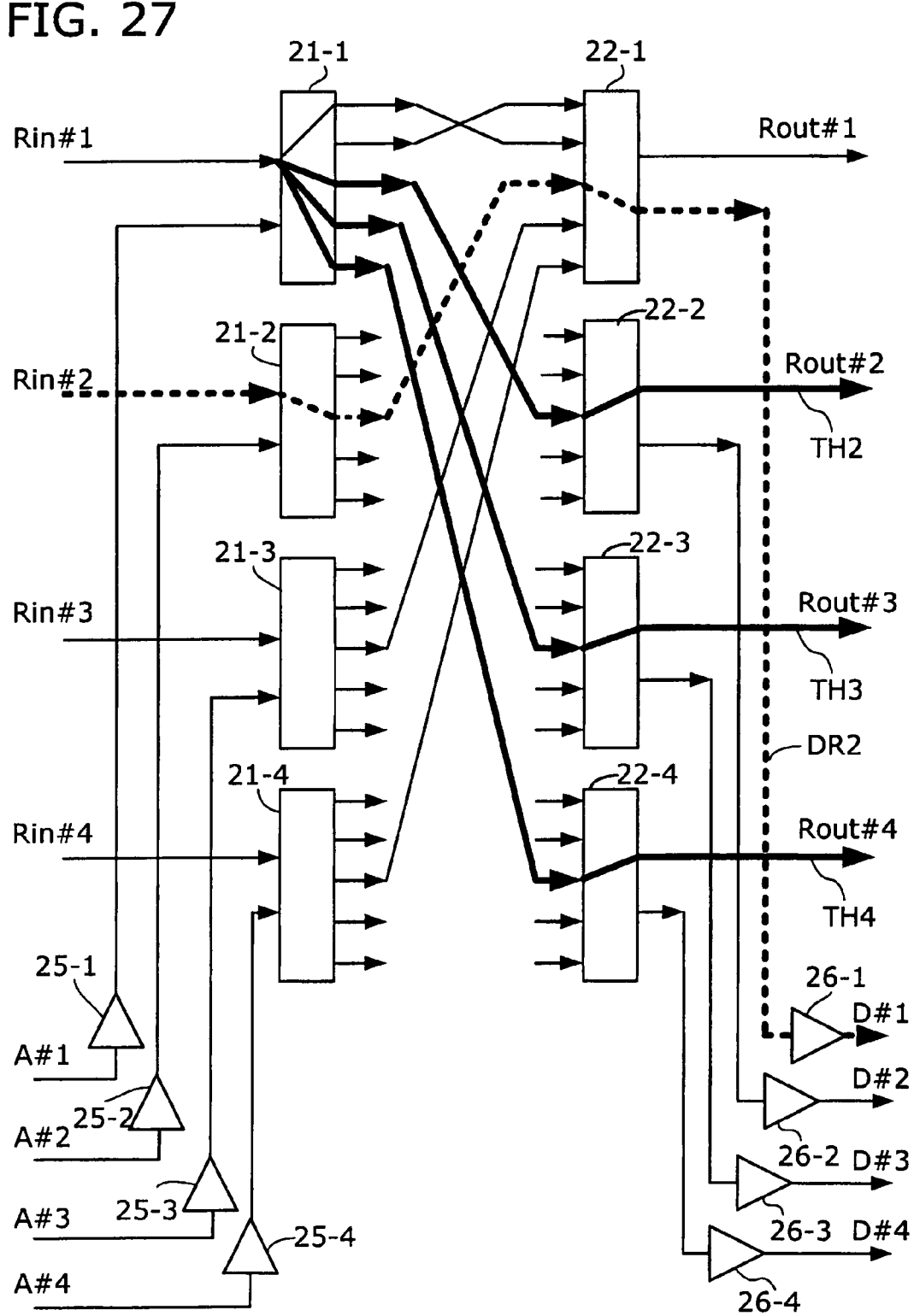

FIG. 27 shows another example of switching paths. The bold dotted line indicates a drop path DR2 from input route Rin#2 to drop route D#1. The bold solid lines represent the following three through paths: TH2 from input route Rin#1 to output route Rout#2; TH3 from input route Rin#1 to output route Rout#3; and TH4 from input route Rin#1 to output route Rout#4. In the case shown in FIG. 27, the drop path DR4 can work simultaneously with any one of the three through paths TH2, TH3, and TH4.

Figure 28:
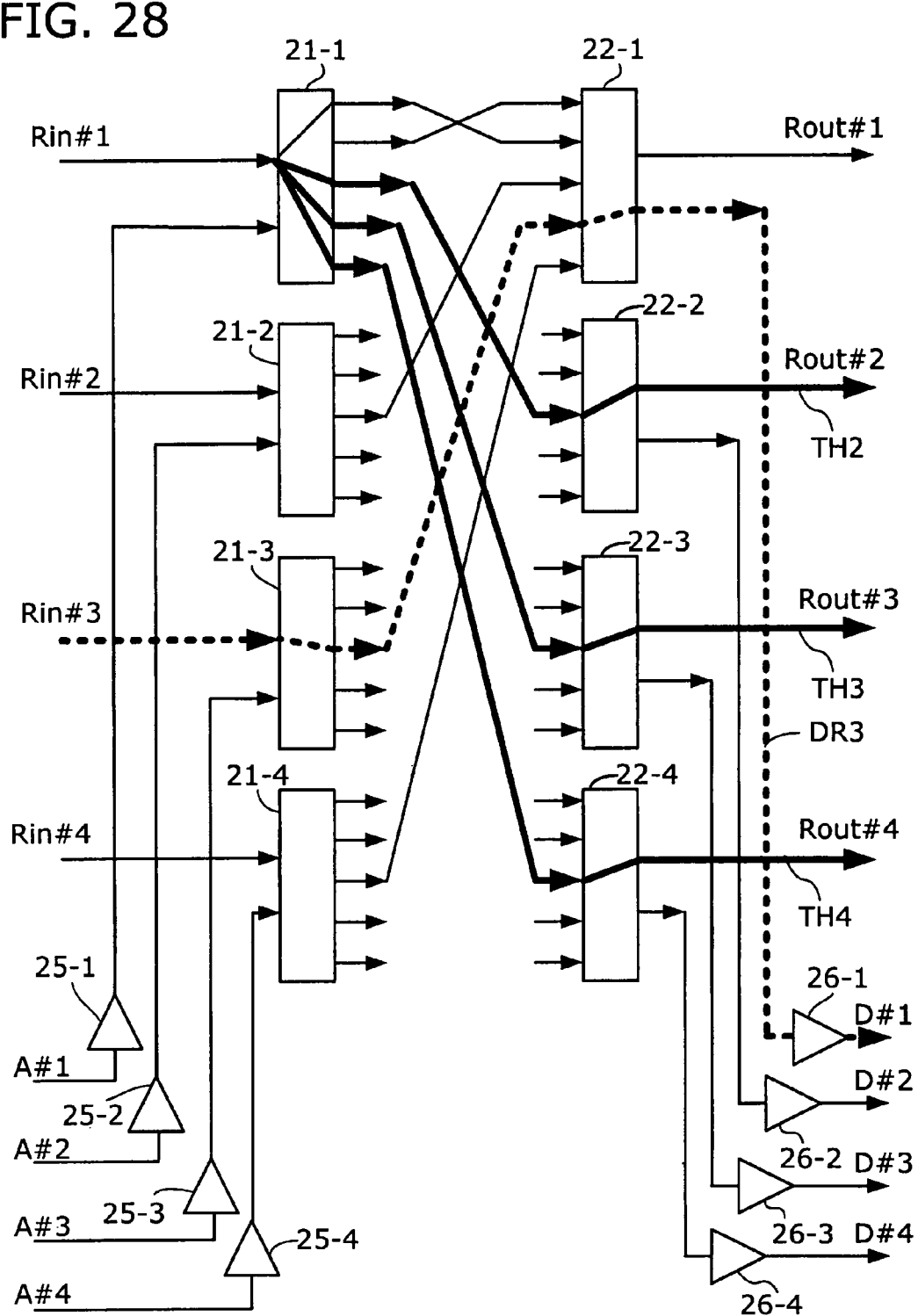

FIG. 28 shows yet another example of switching paths. The bold dotted line indicates a drop path DR3 from input route Rin#3 to drop route D#1. The bold solid lines represent the following three through paths: TH2 from input route Rin#1 to output route Rout#2; TH3 from input route Rin#1 to output route Rout#3; and TH4 from input route Rin#1 to output route Rout#4. In the case shown in FIG. 28, the drop path DR3 can work simultaneously with any one of the three through paths TH2, TH3, and TH4.

Figure 29:
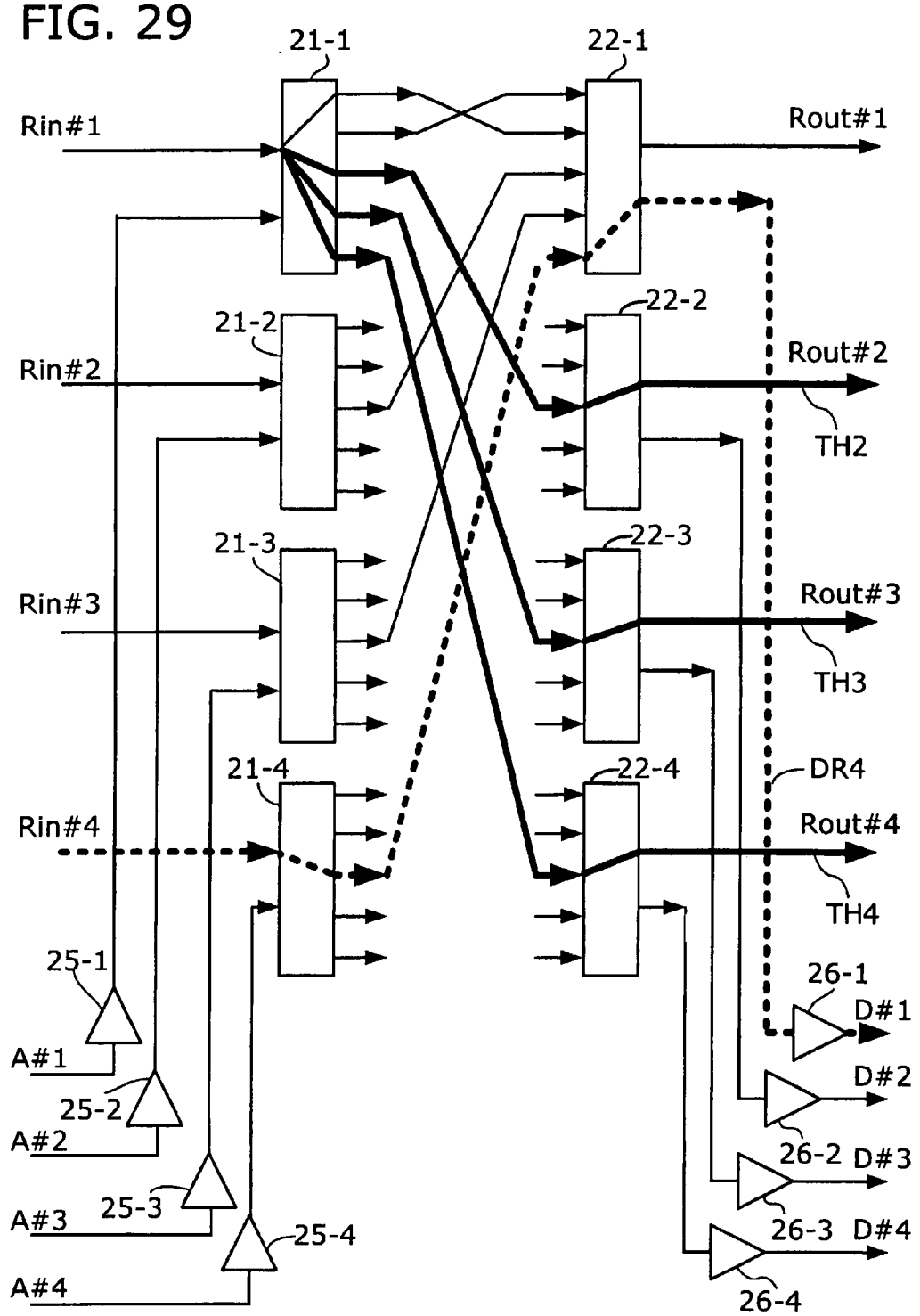
Figure 33:
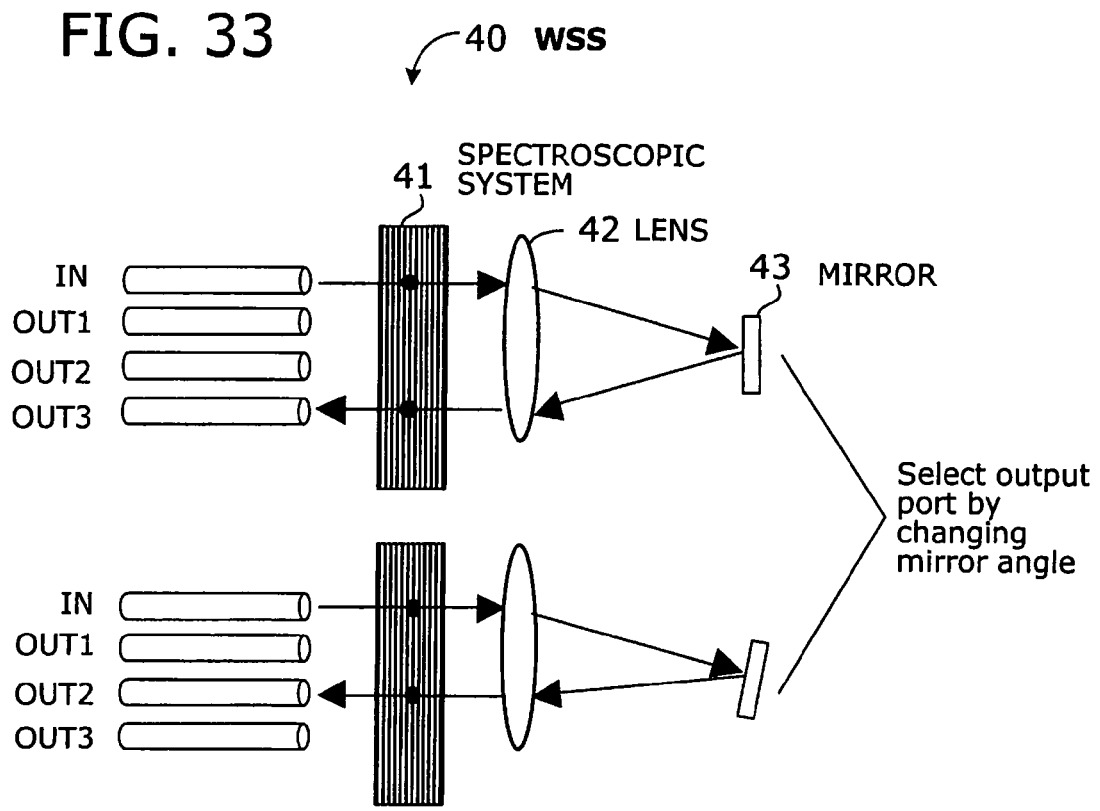
FIG. 33 shows a basic structure of 1×N WSS.
Figure 34:
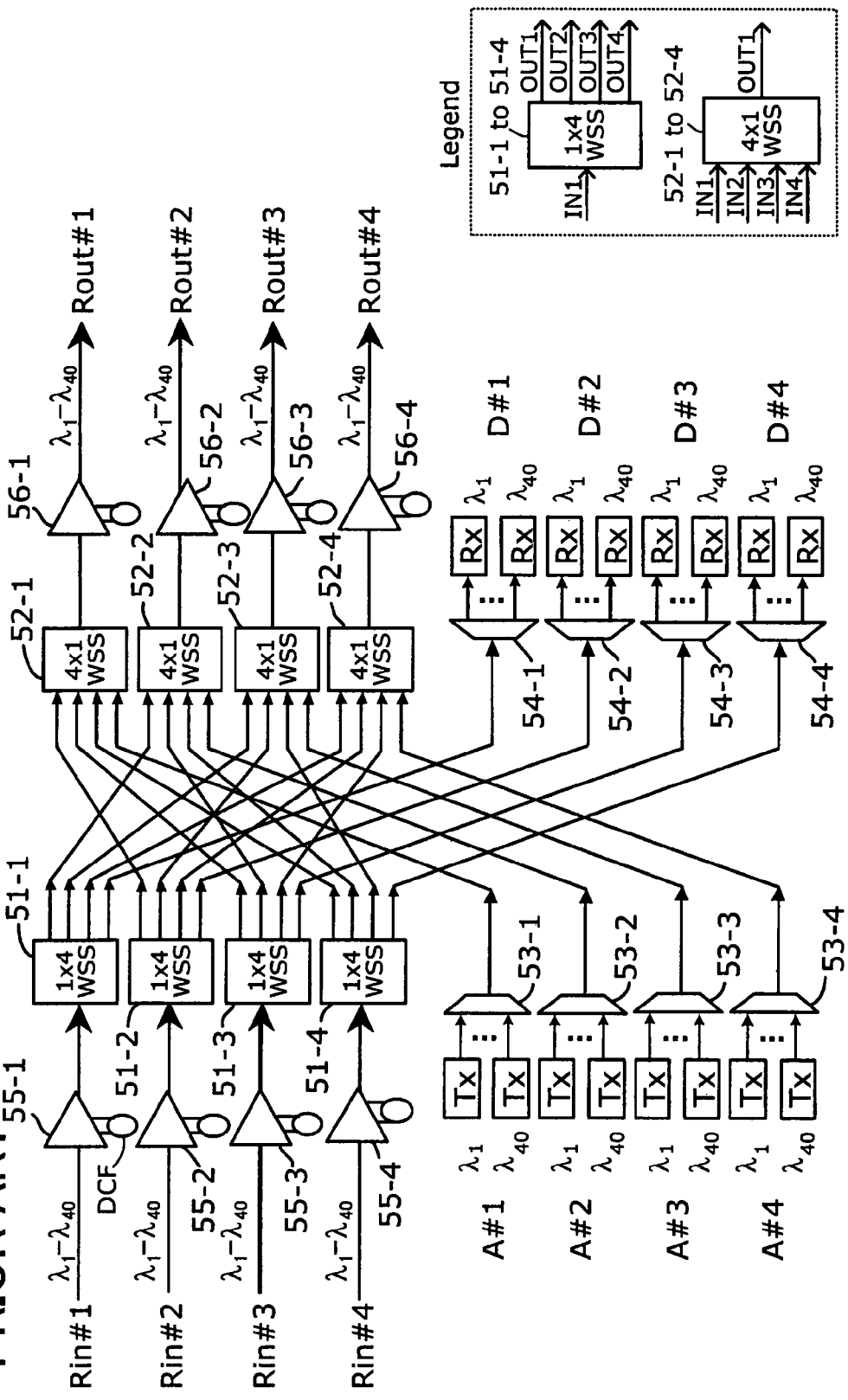
FIG. 34 shows a structure of a conventional optical cross-connect.

FIG. 29 shows still another example of switching paths. The bold dotted line indicates a drop path DR4 from input route Rin#4 to drop route D#1. The bold solid lines represent the following three through paths: TH2 from input route Rin#1 to output route Rout#2; TH3 from input route Rin#1 to output route Rout#3; and TH4 from input route Rin#1 to output route Rout#4. In the case shown in FIG. 29, the drop path DR4 can work simultaneously with any one of the three through paths TH2, TH3, and TH4.

Cross-Connection Feasibility Table (2)

This section describes tables that represent simultaneous feasibility of optical cross-connections. FIGS. 30 and 31 show examples of such tables T21 and T22, respectively. Specifically, table T21 summarizes simultaneous feasibility of optical cross-connections between input route Rin#1 and add route A#1, which has been discussed in an earlier section with reference to FIGS. 22 to 25. Table T22, on the other hand, summarizes simultaneous feasibility of optical cross-connections between input route Rin#1 and drop route D#1, which has been discussed in the preceding section with reference to FIGS. 26 to 29. For the notation of those tables, see the preceding section entitled "Cross-Connection Feasibility Table (1)" describing FIGS. 18 and 19.

FIG. 32 shows another table representing simultaneous feasibility of optical cross-connections. This table T23 is a logical product of table T21 and table T22, which is created by performing a logical operation on each corresponding pair of entries of those two tables. Specifically, let x and y represent respective values of table T21 and table T22 at a particular column and row. The logical product of two table entries (x, y) takes a value of "YES" if (x,y)=(YES,YES) or a value of "NO" if (x,y)=(YES,NO) or (NO,YES) or (NO,NO). The resulting value is then set to a corresponding entry of table T23.

In table T23, the entries having a value of "YES" indicate that the corresponding through switching path and add/drop switching paths can work simultaneously. See, for example, the entry at column 3, row 1. This entry has a value of "YES," meaning that a through switching path from input route Rin#1 to output route Rout#2, an add switching path from add route A#1 to output route Rout#3, and a drop switching path from input route Rin#3 to drop route D#1 can all work at the same time.

The other entries of table T23 have a value of "NO" to indicate that either the corresponding through switching path or the corresponding add/drop switching paths can work selectively. See the top-left entry of table T23, for example. This table entry indicates that the optical cross-connect 2a does not allow simultaneous use of a through switching path from input route Rin#1 to output route Rout#2, an add switching path from add route A#1 to output route Rout#1, and a drop switching path from input route Rin#1 to drop route D#1. Reversely stated, the table entry suggests that either the through switching path alone or the add/drop switching paths can be implemented.

In reality, it may not be necessary to make available every combination of a through path and add/drop paths for simultaneous use. Rather, most cases require either the former or the latter alone. Under this assumption, table T23 is more optimal, or less redundant, than table T63 discussed earlier in FIG. 39 since table T23 contains a smaller number of entries marked "YES" than table T63. The present embodiment reduces the number of simultaneously workable switching patterns.

More specifically, compare the switching patterns P1 to P4 shown in table T23 of FIG. 32 with the corresponding entries of table T63 of FIG. 39. The conventional optical cross-connect 60 (FIG. 35) allows the simultaneous use of those switching patterns P1 to P4. In contrast, the optical cross-connect 2a according to the present embodiment removes the simultaneity of such patterns P1 to P4. In the case of P1, the optical cross-connect 2a requires to choose either a through switching path from Rin#1 to Rout#3 or add/drop switching paths from A#1 to Rout#2 and from Rin#2 to D#1. In the case of pattern P2, it requires to choose a through switching path from Rin#1 to Rout#4 or add/drop switching paths from A#1 to Rout#2 and from Rin#2 to D#1. Further, in the case of pattern P3, it requires to choose a through switching path from Rin#1 to Rout#4 or add/drop switching paths from A#1 to Rout#3 and from Rin#3 to D#1. In the case of pattern P4, it requires to choose a through switching path from Rin#1 to Rout#2 or add/drop switching paths from A#1 to Rout#4 and from Rin#4 to D#1.

In summary of this section, the proposed optical cross-connect 2a eliminates many of the unnecessary combinations of through switching paths and add/drop switching paths, thus optimizing the number of WSSs used and interconnections between them. The present invention thus contributes to the realization of an optimally-sized optical cross-connect.

CONCLUSION

To summarize the above discussion, the present invention offers an optical cross-connect including a 2×N (2-input, N-output) wavelength selective switch for each of N input routes and a N×2 (N-input, 2-output) wavelength selective switch for each of N output routes. One input port of each 2×N wavelength selective switch receives an optical signal from a corresponding input route, while the other input port of the same receives an optical add signal from a corresponding add route. One output port of each N×2 wavelength selective switch outputs an optical signal to a corresponding output route, while the other output port outputs an optical drop signal to a corresponding drop route. This structure eliminates unnecessary combinations of through switching paths and add/drop switching paths, thus greatly reducing the number of WSSs used and interconnections between them.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical cross-connect switching optical signals of N routes (N=1, 2, . . . ), the optical cross-connect comprising:
   2-input N-output (2×N) wavelength selective switches coupled respectively to N input routes; and
   N-input 2-output (N×2) wavelength selective switches coupled respectively to N output routes;
   wherein:
   one input port of the nth 2×N wavelength selective switch (n=1, 2, . . . N) coupled to the nth input route receives an optical signal from the nth input route while the other input port thereof receives an optical add signal from the nth add route; and
   one output port of the nth N×2 wavelength selective switch outputs an optical signal to the nth output route while the other output port thereof outputs an optical drop signal to the nth drop route;
   and wherein:
   (N−1) out of N output ports of the nth 2×N wavelength selective switch are connected respectively to (N−1) input ports of (N−1) N×2 wavelength selective switches other than the nth N×2 wavelength selective switch coupled to the nth output route;
   the remaining output port of the nth 2×N wavelength selective switch outputs an optical drop signal to the nth drop route; and
   the remaining input port of the nth N×2 wavelength selective switch receives the optical add signal from the nth add route.

2. The optical cross-connect according to claim 1, further comprising N 1-input 2-output (1×2) couplers placed respectively on the N add routes, the nth 1×2 coupler comprising:
   an input port to receive an optical add signal from the nth add route;
   a first output port connected to the other input port of the nth 2×N wavelength selective switch; and
   a second output port connected to an input port of the nth N×2 wavelength selective switch;
   wherein the second output port of the nth 1×2 coupler supplies the nth N×2 wavelength selective switch with the received optical add signal if that add signal is supposed to be added to the nth output route, and
   wherein the first output port of the nth 1×2 coupler supplies the nth 2×N wavelength selective switch with the received optical add signal if that add signal is supposed to be added to one of the output routes other than the nth output route.

3. The optical cross-connect according to claim 1, further comprising N 2-input 1-output (2×1) couplers placed respectively on the N drop routes, the nth 2×1 coupler comprising
   a first input port connected to one of N outputs of the nth 2×N wavelength selective switch to receive therefrom a first optical drop signal;
   a second input port connected to the other output port of the nth N×2 wavelength selective switch to receive therefrom the optical drop signal as a second optical drop signal; and
   an output port that outputs the received first optical drop signal or the received second optical drop signal.

4. An optical cross-connect switching optical signals of N routes (N=1, 2, . . . ), the optical cross-connect comprising:
   2-input (N+1)-output (2×(N+1)) wavelength selective switches coupled respectively to N input routes; and
   (N+1)-input 2-output ((N+1)×2) wavelength selective switches coupled respectively to N output routes; and
   wherein:
   one input port of the nth 2×(N+1) wavelength selective switch (n=1, 2, . . . N) coupled to the nth input route receives an optical signal from the nth input route while the other input port of same receives an optical add signal from the nth add route; and
   one output port of the nth (N+1)×2 wavelength selective switch outputs an optical signal to the nth output route while the other output port of same outputs an optical drop signal to the nth drop route;

and wherein:

a first output port of the nth 2×(N+1) wavelength selective switch is connected to a second input port of the nth (N+1)×2 wavelength selective switch;

a second output port of the nth 2×(N+1) wavelength selective switch is connected to a first input port of the nth (N+1)×2 wavelength selective switch; and the remaining ((N+1)−2) output ports of the nth 2×(N+1) wavelength selective switch are connected respectively to (N−1) input ports of (N−1) (N+1)×2 wavelength selective switches other than the nth (N+1)×2 wavelength selective switch coupled to the nth output route.

* * * * *